(12) United States Patent
Gordaychik

(10) Patent No.: US 11,483,845 B2
(45) Date of Patent: Oct. 25, 2022

(54) ADVANCED MOBILE DEVICES AND NETWORK SUPPORTING SAME

(71) Applicant: Brian Gordaychik, Columbus, NJ (US)

(72) Inventor: Brian Gordaychik, Columbus, NJ (US)

( * ) Notice: Subject to any disclaimer, the term of this patent is extended or adjusted under 35 U.S.C. 154(b) by 148 days.

(21) Appl. No.: 17/001,064

(22) Filed: Aug. 24, 2020

(65) Prior Publication Data

US 2021/0058936 A1 Feb. 25, 2021

Related U.S. Application Data

(60) Provisional application No. 62/983,622, filed on Feb. 29, 2020, provisional application No. 62/891,162, filed on Aug. 23, 2019.

(51) Int. Cl.
| | |
|---|---|
| *H04L 12/28* | (2006.01) |
| *H04W 72/08* | (2009.01) |
| *H04W 72/04* | (2009.01) |
| *H04J 1/16* | (2006.01) |
| *H04W 80/02* | (2009.01) |
| *H04W 88/08* | (2009.01) |

(52) U.S. Cl.
CPC ..... *H04W 72/085* (2013.01); *H04W 72/0453* (2013.01); *H04W 80/02* (2013.01); *H04W 88/08* (2013.01)

(58) Field of Classification Search
CPC ... H04B 7/0452; H04L 1/1621; H04L 5/0058; H04W 72/0453; H04W 84/12; H04W 88/08; H04W 72/1215; H04W 88/06
USPC .................................. 370/252, 329, 389, 430
See application file for complete search history.

(56) References Cited

U.S. PATENT DOCUMENTS

| | | | | |
|---|---|---|---|---|
| 2016/0309478 | A1* | 10/2016 | Nabetani | H04L 1/0026 |
| 2017/0099658 | A1* | 4/2017 | Shattil | H04B 7/024 |
| 2017/0150493 | A1* | 5/2017 | Seok | H04B 7/0452 |
| 2020/0396019 | A1* | 12/2020 | Lumbatis | H04W 24/10 |

* cited by examiner

*Primary Examiner* — John Pezzlo
(74) *Attorney, Agent, or Firm* — Volpe Koenig

(57) ABSTRACT

A wireless device having a plurality of media access control (MAC) addresses may receive information about a second access point (AP) from a first AP. The wireless device may receive a first group based transmission, on an operating band of the first AP, from the first access point (AP). The first group based transmission may have a preamble portion which indicates a modulation scheme used for a portion subsequent to the preamble portion. The first group based transmission may have a data portion and a first header portion. The wireless device may receive a second group based transmission, on an operating band of the second AP, from the second AP. The second group based transmission may have a second data portion having a second header portion. The second data portion may be modulated according to 4096 QAM.

20 Claims, 15 Drawing Sheets

ADVANCED MOBILE DEVICES AND NETWORK SUPPORTING SAME

CROSS REFERENCE TO RELATED APPLICATIONS

This application claims the benefit of U.S. provisional application No. 62/983,622 filed on Feb. 29, 2020 and U.S. provisional application No. 62/891,162 filed on Aug. 23, 2019, which are incorporated by reference as if fully set forth.

SUMMARY

A wireless device having a plurality of media access control (MAC) addresses may receive information about a second access point (AP) from a first AP. The wireless device may receive a first group based transmission, on an operating band of the first AP, from the first access point (AP). The first group based transmission may have a preamble portion which indicates a modulation scheme used for a portion subsequent to the preamble portion. The first group based transmission may have a data portion and a first header portion. The wireless device may receive a second group based transmission, on an operating band of the second AP, from the second AP. The second group based transmission may have a second data portion having a second header portion. The second data portion may be modulated according to 4096 QAM. The second group based transmission may include a second header portion. The wireless device may determine whether the first group based transmission comprises data which is duplicative of the second group based transmission, based on the first header portion and the second header portion. The wireless device may transmit feedback, to the first AP or the second AP, based on reception of the data. The first group based transmission may be addressed to a first MAC address of the plurality of MAC addresses and the second group based transmission may be addressed to a second MAC address of the plurality of MAC addresses.

BRIEF DESCRIPTION OF THE DRAWING(S)

Figure 9:
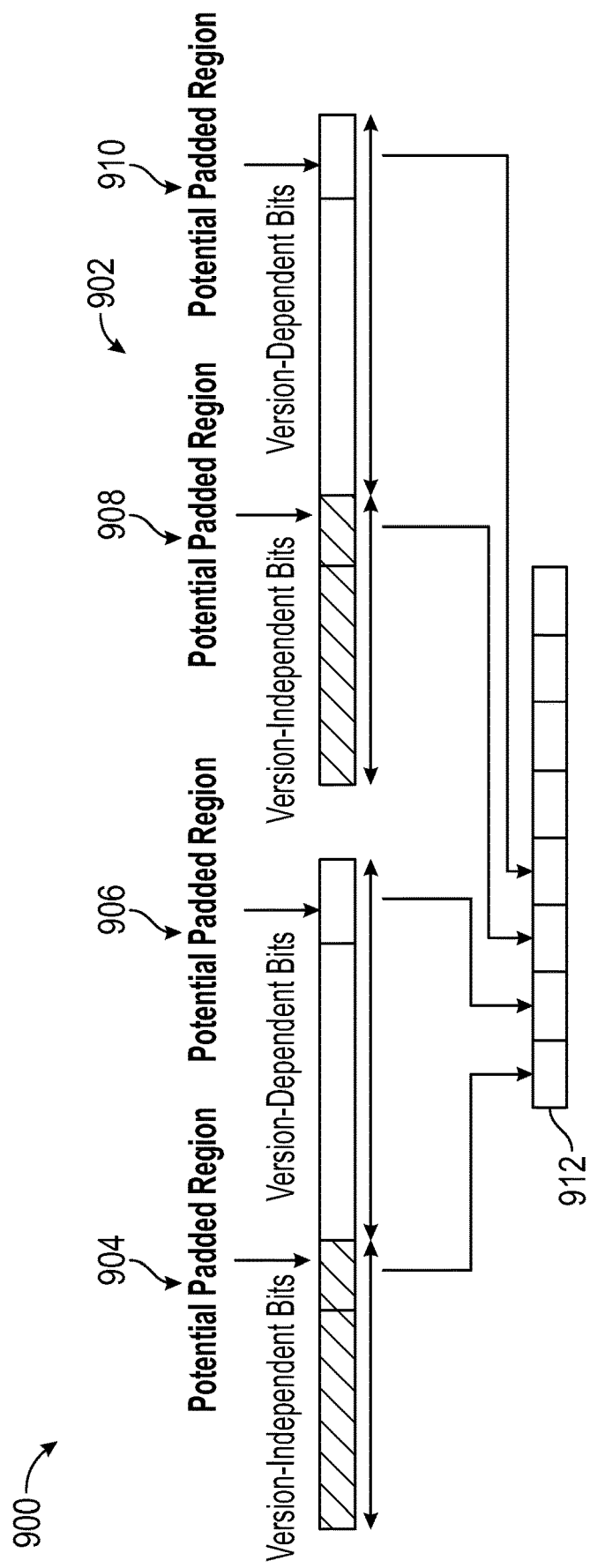
Figure 10:
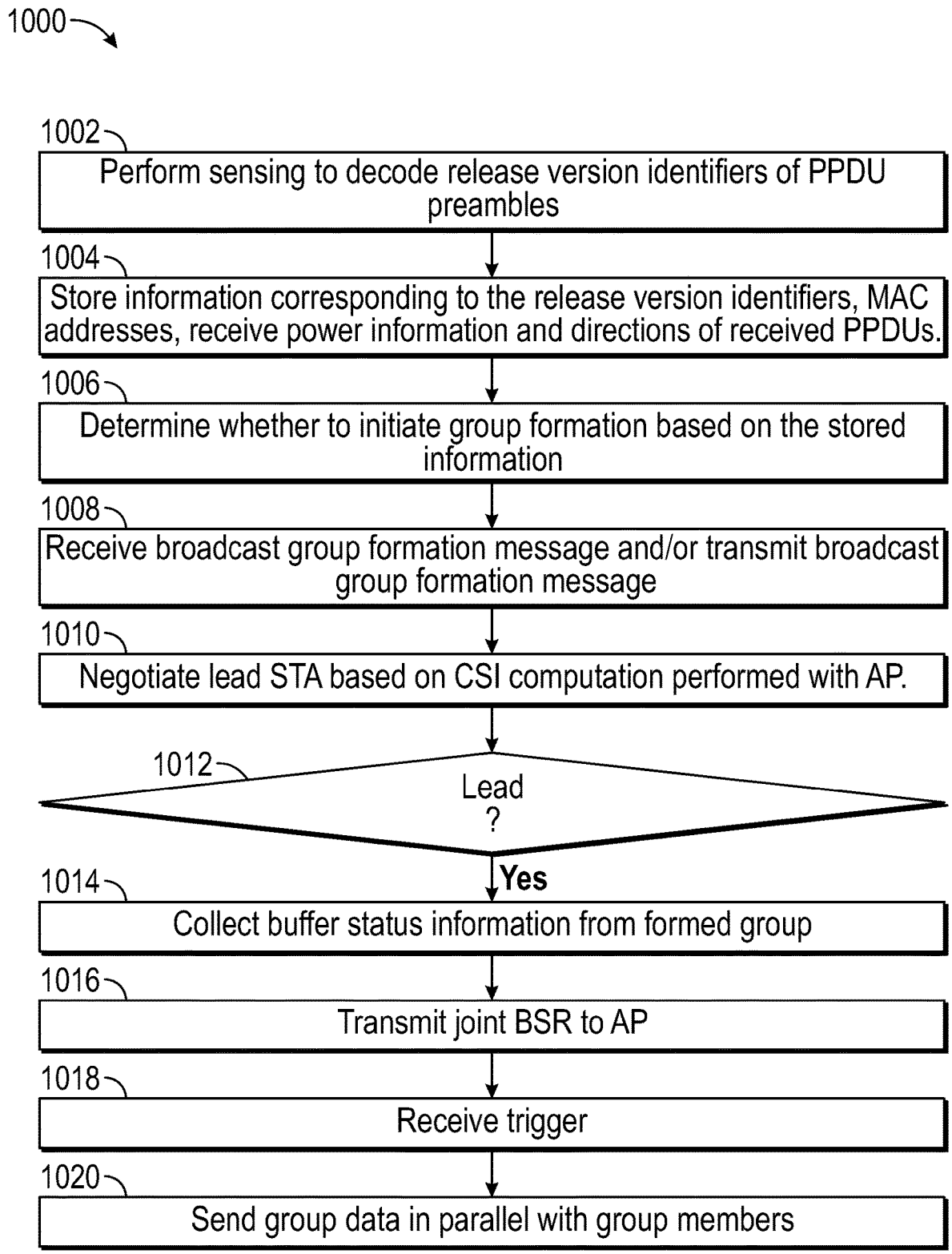
Figure 11:
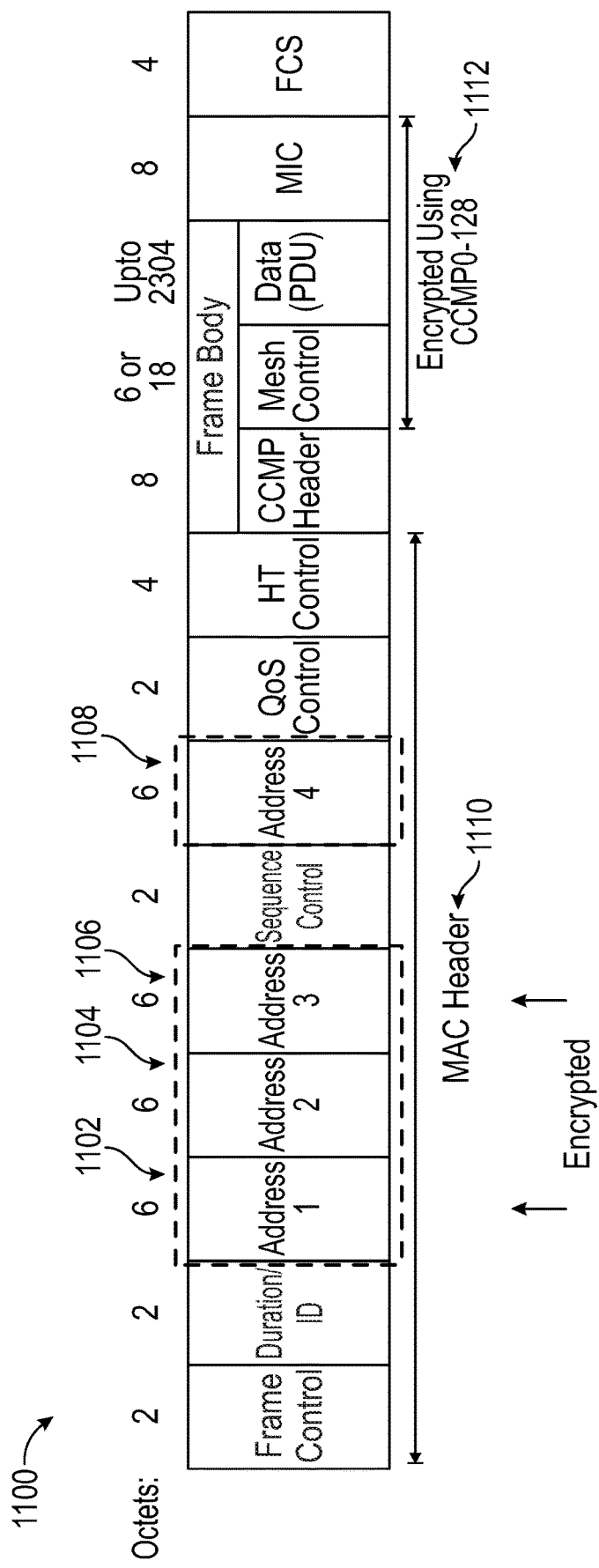
Figure 12:
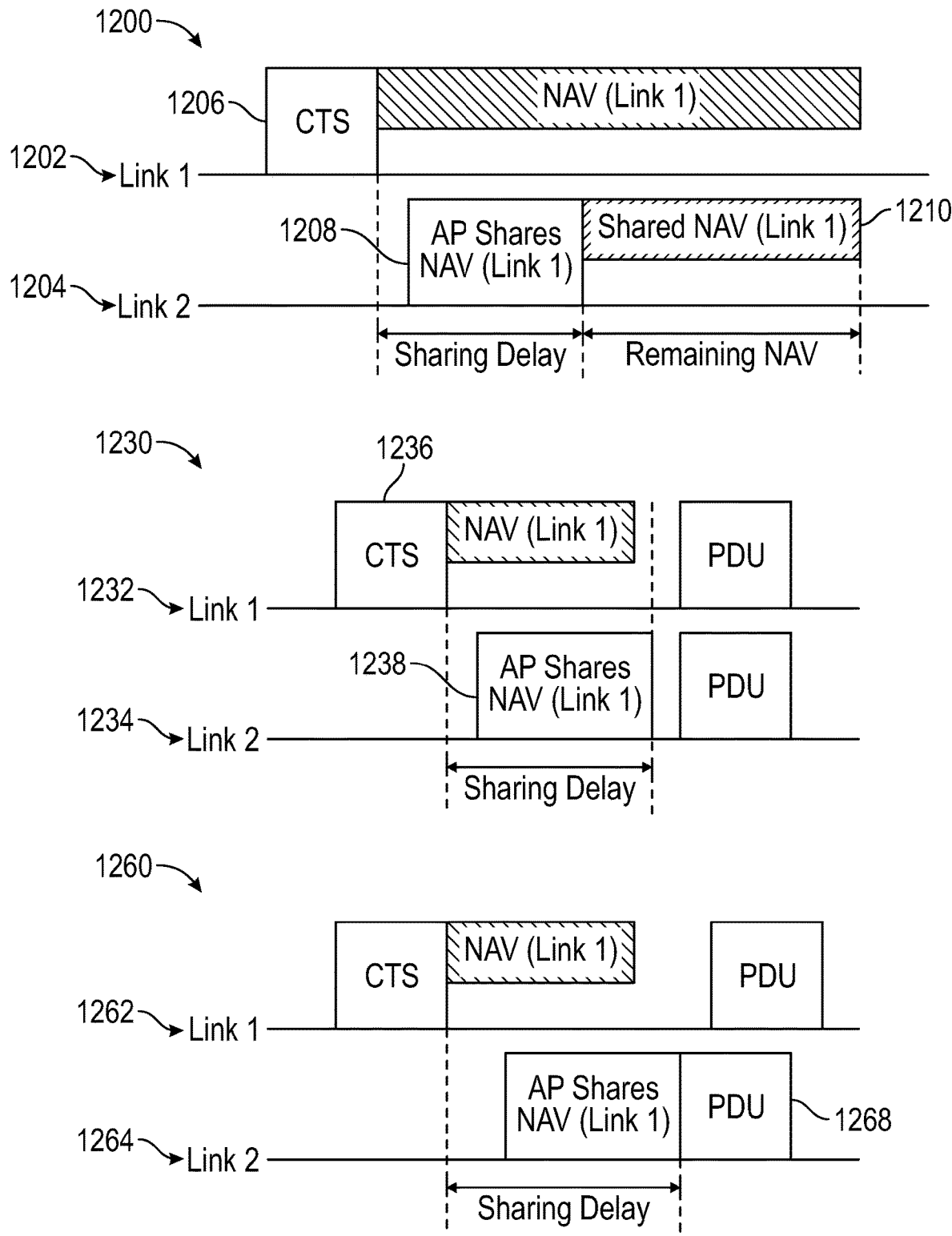

FIG. 9 demonstrates that a portion of each universal signal (U-SIG) field transmitting in a plurality of frames may be buffered to form a larger data block;

FIG. 10 illustrates a flowchart for group transmission;

FIG. 11 illustrates a frame having one or more encrypted address fields in a medium access control (MAC) header;

FIG. 12 illustrates a plurality of network allocation vector (NAV) setting examples.

Figure 13:
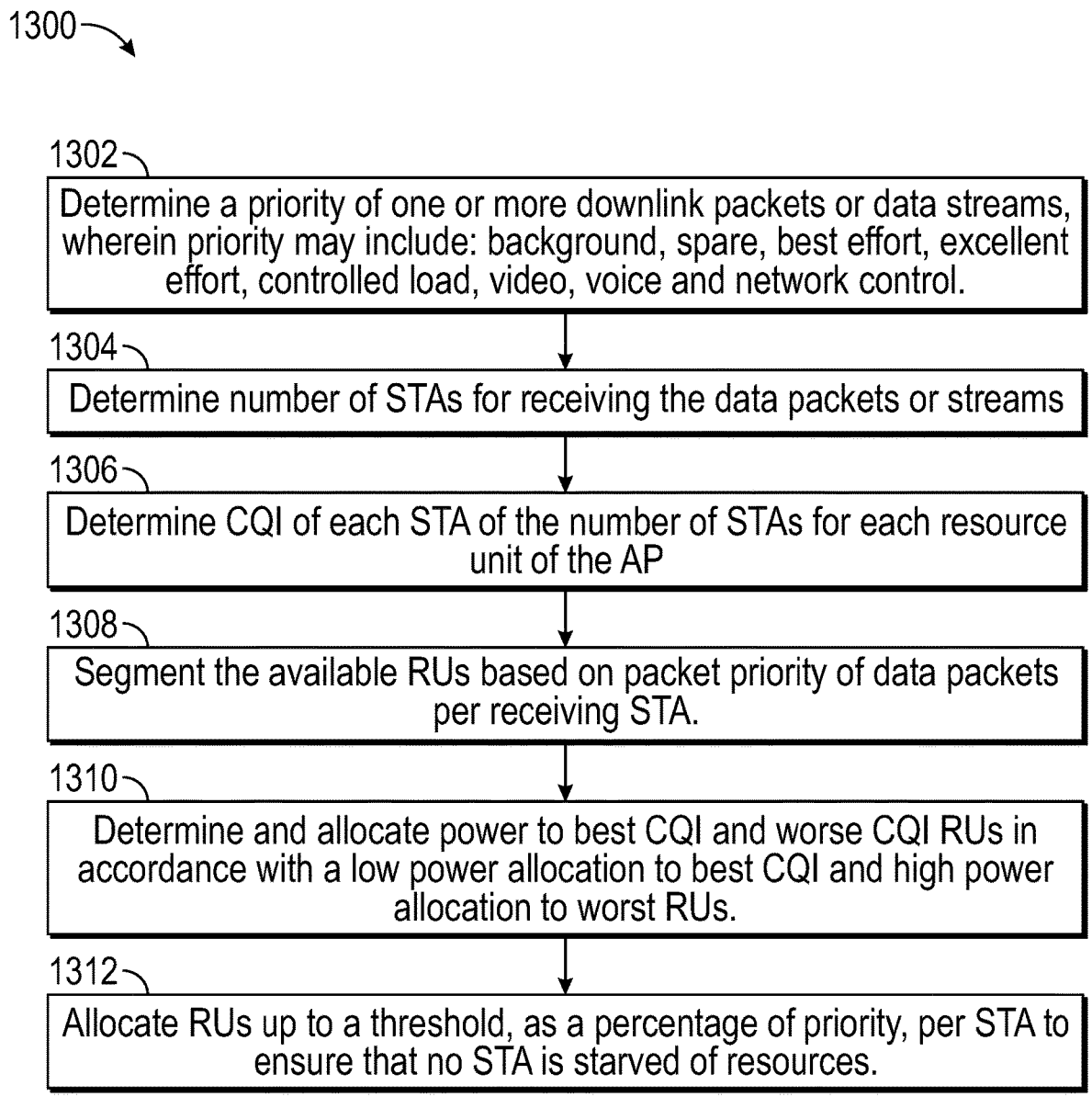
Figure 14:
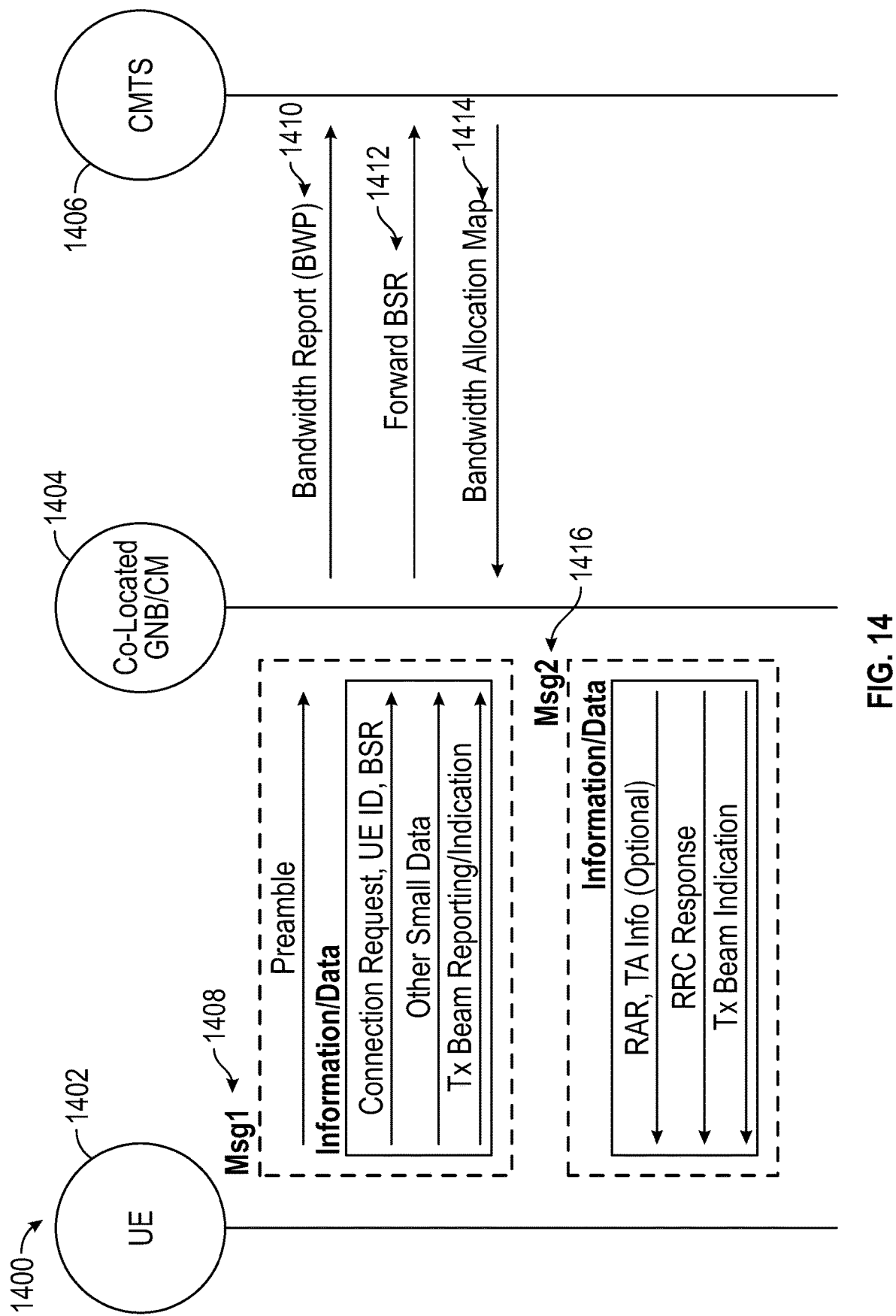
Figure 15:
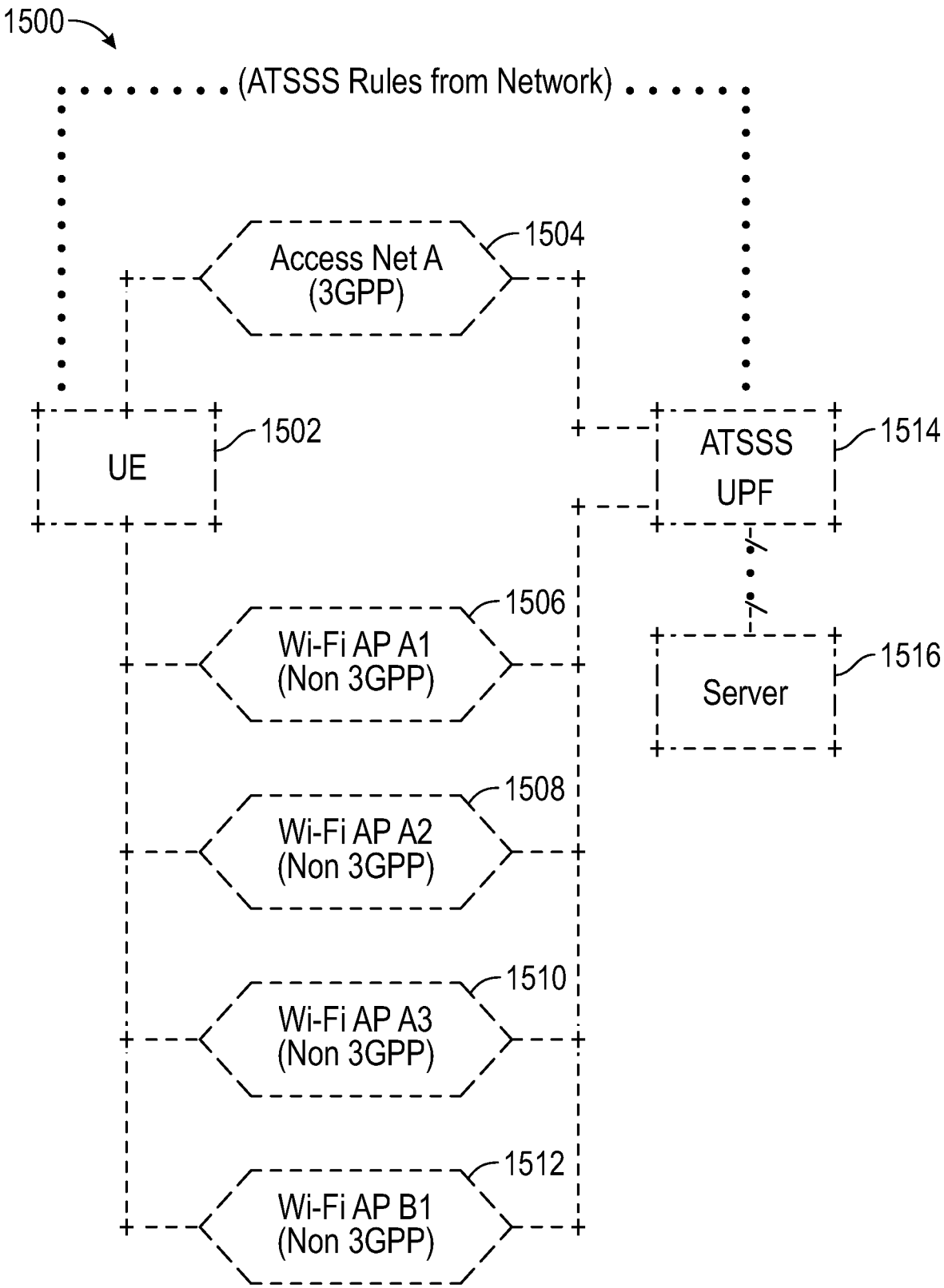
Figure 16:
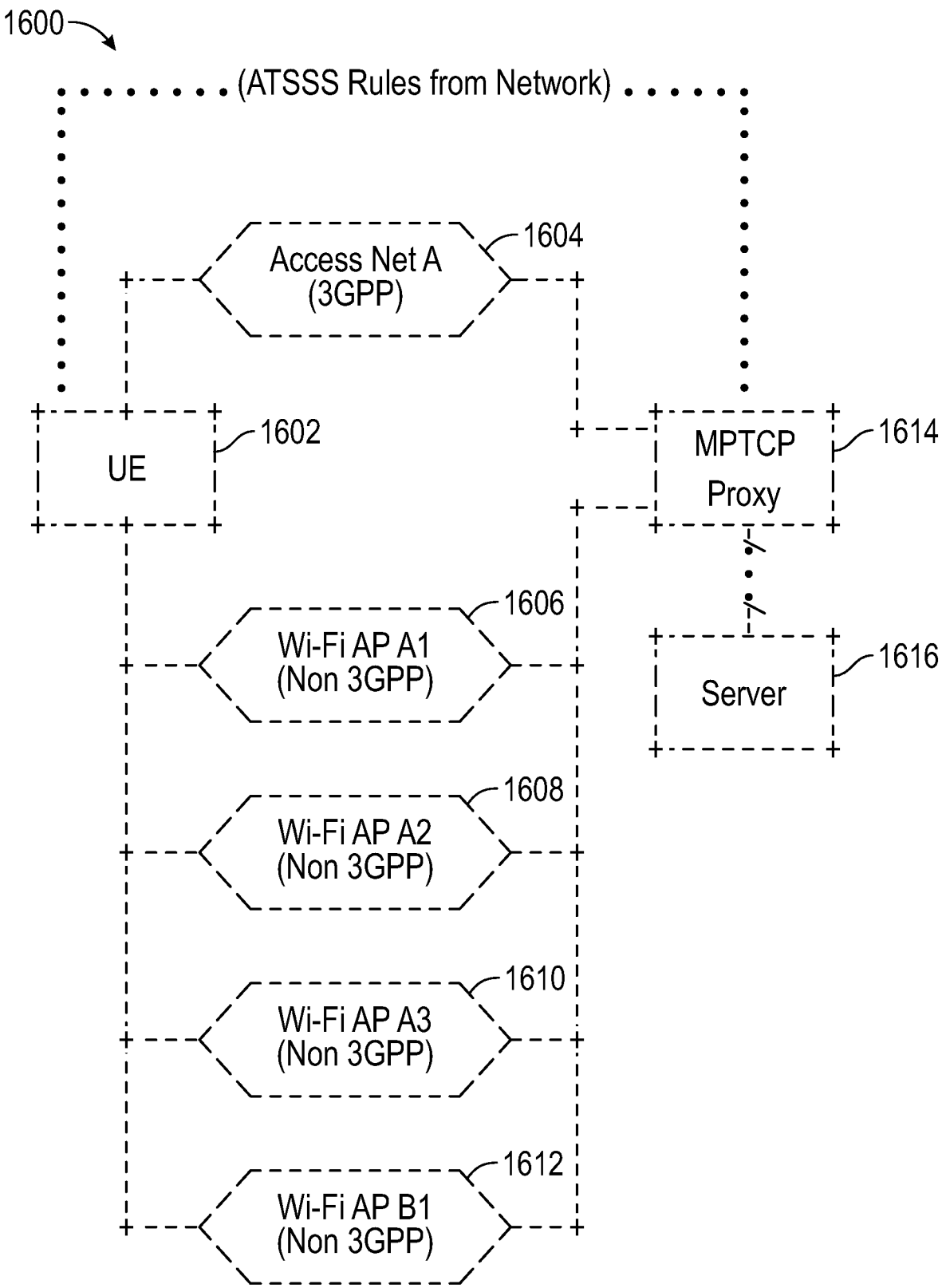

FIG. 13 illustrates an exemplary method for resource allocation;

FIG. 14 illustrates a two-step RACH procedure which provides information over a Data over cable service interface specification (DOCSIS) type backhaul;

FIG. 15 shows that Access Traffic Steering, Switching and Splitting (ATSSS) rules from the network may be configured to a UE and ATSSS user plane function (UPF); and FIG. 16 shows that ATSSS rules from the network may be configured to a UE and an multipath transmission control protocol (TCP) (MPTCP) proxy.

DETAILED DESCRIPTION OF THE PREFERRED EMBODIMENT(S)

In an embodiment, millimeter wave (mmWave) bands may be shared among multiple radio access technologies (RATs). Advanced mobile devices may operate in high frequency bands, for example, bands over 30, 40 or 50 ghz (mmWave) bands and up to 70, 80, 90, 100 ghz and above. High frequency bands may be licensed bands and unlicensed bands. In unlicensed bands, it is important for devices to perform sensing and occupancy detection before transmission. However, at high frequencies, it may be difficult for STAs to determine whether or not a channel, band, frequency or the like is available or is occupied. Apparatus and methods disclosed herein address embodiments where mobile devices share access to spectrum.

mmWave sensing may be coordinated among STAs. In some embodiments, STAs may need only sense a portion, for example, a frequency, time or spatial resource before transmitting or requesting to transmit. Sensing may employ detection of a Energy Detection Threshold (EDT) which may vary over the portion. Sensing may be performed for determining channel occupancy, group formation among other aspects. Sensing may be performed on bands which have higher subcarrier spacing (SCS) than that of 5G.

Coordination may be among APs, among STAs or coordinated among STAs and APs. STAs may be jointly in communication with APs and/or STAs on same frequency resources and thus may need to coordinate joint transmission aspects. For example, devices may negotiate a density of phase tracking reference signals (PT-RS) from which transmitters to transmit and monitor. PT-RS density may be determined based on channel occupancy, success/failure of previous sensing results, modulation type, transmission format including subcarrier spacing bandwidth etc. PT-RS density may be determined based on QoS of data for transmission or higher layer parameters. Other parameters of the PT-RS may be negotiated, for example a transmission power, angle (beam) or the like.

Coordination may be based on capability, for example, device capability being a sensor, wearable surveillance, low/high power device, or the like or coordination may be based on release version. Coordination may involve coordination of the bands, subbands, subchannels, time/frequency resources, space resources and the like. Coordination may be achieved based on transmitting parameters for sensing by a STA or AP. In an embodiment, an AP may maintain a list of parameters for sensing and may provide them to STAs.

Coordination aspects may be shared on lower frequency bands than higher frequency bands. In an embodiment, lower frequency bands may be used for exchanging information between devices to determine a proximity of one another. Proximity information may be fed back to transmitters to determine whether a hidden node problem exists. With proximity information, two transmitters which are remote, may be able to coordinate transmissions to two receivers which are nearby. Proximity information may be shared/determined using the lower frequencies and reported to the transmitters via high frequency transmissions. This is able to occur, because the hidden node issue may not apply to the transmissions of the conflicting receivers.

In a dual connectivity environment, higher frequency bands may not be employed when a round trip time (RTT) exceeds a threshold. When RTT is high, for example, due to a UE being far from a base station, the UE is more likely to experience more blocking events than when RTT is low, i.e. the UE is closer to the base station. A network device may indicate to a UE, via RRC signaling or other signaling, that any one or more of the parameters disclosed herein may change based on RTT or RTT threshold.

A mobile edge computing (MEC) service may enable sensing negotiation, for example, providing responses to requests for sensing configurations and parameters, based on parameters provided to the MEC service from infrastructure and wireless nodes with a network. A MEC has limited space, for example, at a BS or AP and that limited space may need to be managed.

For example, a MEC device located at a transceiver may be configured to only cache applications when they are needed, for example, based on a number of users in a cell or geographical area. It may be done based on a number of requests for an MEC app, application service type or the like. For example, the MEC device may run a counter and after a threshold, the MEC device may request an APP from the network. This may be done if there is threshold space available. Caching of data may be performed.

In this way, the MEC device may only cache data based on whether or not the data is expected to be used in the future. Data may be cached based on a throughput between a MEC app and a data provided. Fore example, if the throughput is high, caching operations may not be employed. When throughput is low, caching services may be needed even more.

Stations (STAs) may receive an allocation in time, frequency or space. In an embodiment, a STA may receive an allocation in frequency, for example, a channel, subchannel or the like and may transmit data at a given priority or higher. For example, a channel may be assigned for video, voice or high bandwidth applications and STA may transmit any priority above the given priority for the channel. Trigger frames may be used to allocate channels, bands, link identifier, AP identifier, transmitter identifier, receiver(s), group(s), for example, using a groupcast address, or the like etc. Information elements may be in the header or body portion of the message. Lower priority data may be transmitted on other channels, for example, with or without employing a listen before talk or clear channel assessment procedure, for example, based on Enhanced Distributed Channel Access (EDCA). Lower priority transmission may or may not be multiplexed instead of dropped scenarios. Trigger frames may indicate STAs by identifier, for example, mac address, AID or the like. Trigger frames may allocate a channel by a channel ID, subchannel ID or a band ID or the like. Partial allocations may also be available, for example, an entire channel allocation and a periodicity or time based allocation of another channel may be assigned. Maximum channel occupancy times (COT) may vary per receiver/transmitter and may be assigned or modified according to parameters disclosed herein.

Figure 1:
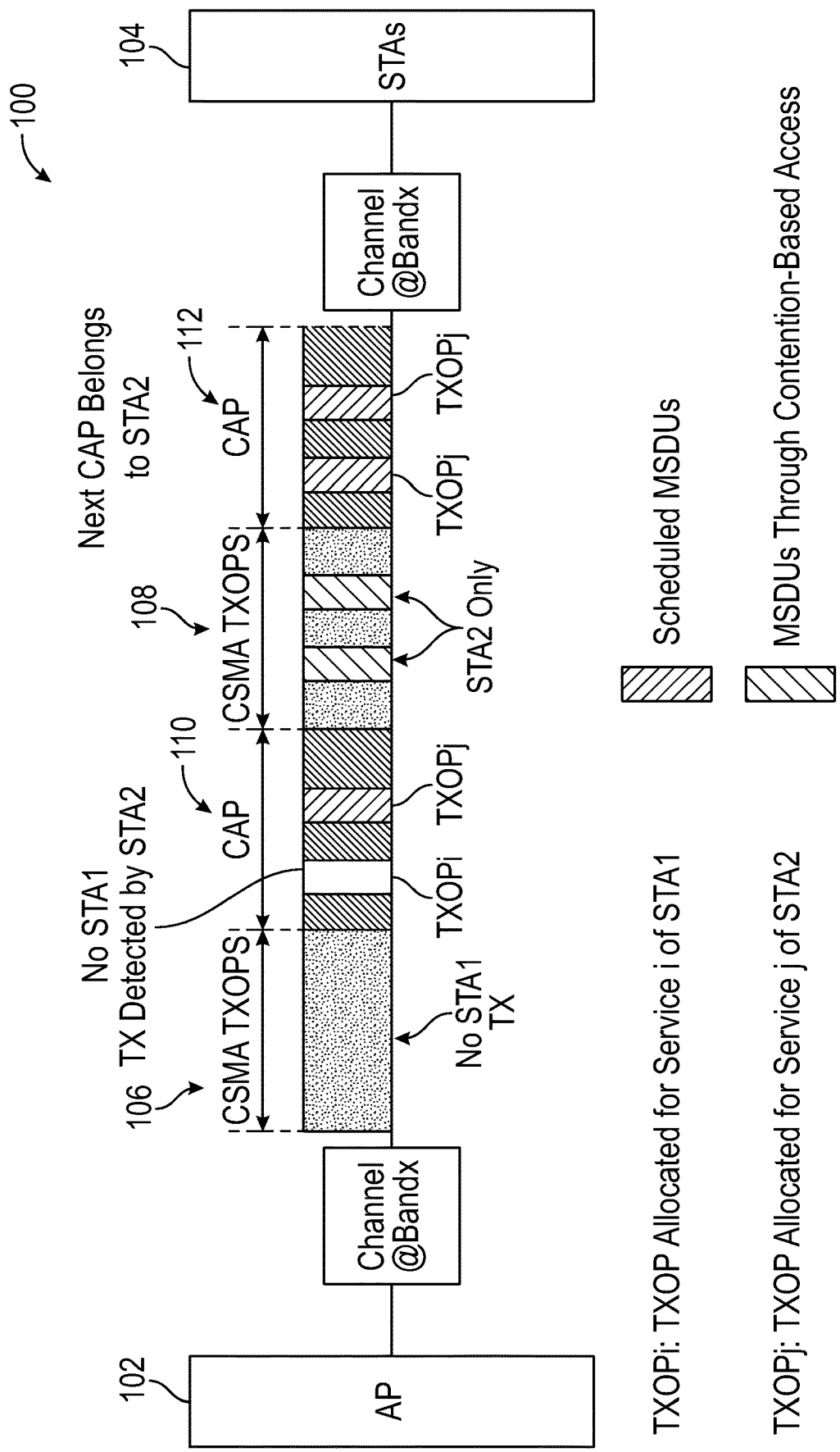
FIG. 1 is an example communication diagram of an access point (AP) and one or more stations (STAs)

FIG. 1 is an example of an access point (AP) 102 and one or more stations (STAs) 104. As shown in FIG. 1, an AP may delineate CSMA TXOPS 106, 108 followed by CAP periods 110, 112 which are non-contention based periods. If STA2 detects that STA1 does not transmit in a first CSMA TXOP 106 and does not transmit on a following scheduled non contention based CAP transmission 110 and makes no transmission in a subsequent CSMA TXOP 108, STA2 may assume that a CAP 112 that follows belongs completely to itself, i.e. STA2. In another option, if the traffic transmitted by STA1 is periodic traffic, for example, on an x ms schedule, if STA2 detects no transmission from STA1 for this period, the STA2 may assume that a CAP which follows can be used more fully. Other network access mechanisms may be used, for example, Non-Broadcast Multiple Access (NBMA).

The use of the channel by STA2 may be more subtle than simply detecting no transmission for a period. For example, the STA2 may scan multiple channels or multiple channel bands for the transmission of STA1. If STA1 does not transmit on channel y, for example, STA2 may determine that channel x is available even though a portion of CAP has been dedicated to STA1. If STA2 detects that there are more STA2 which rely on the CAP, the STA2 may backoff the CAP or may transmit only for a reduced or random time, etc. STAs may also consider the relative power levels (for example, selected based on an instruction or previous transmission/reception) or receive an explicit indication from the STA for determining whether another STA no longer needs a scheduled resource. Transmissions to STAs or from STAs may have legacy fields used to indicate parameters to legacy type devices. Fields which follow the legacy fields, for example, HE-SIG fields (SIG-A) or (SIG-B) fields may indicate parameters for more modern type devices. A HE-SIG field may include training information and a number of training fields may be provided. The number of fields may be indicated prior to the information fields being transmitted. This way, a receiver can decode the number of fields which may be received. In addition to training information, the SIG fields may include a number of group IDs (preceded by a number of group IDs identifier. Additionally, a number of STAs may be indicated, a number of messages which follow or the like may be included in a SIG field.

Figure 2:
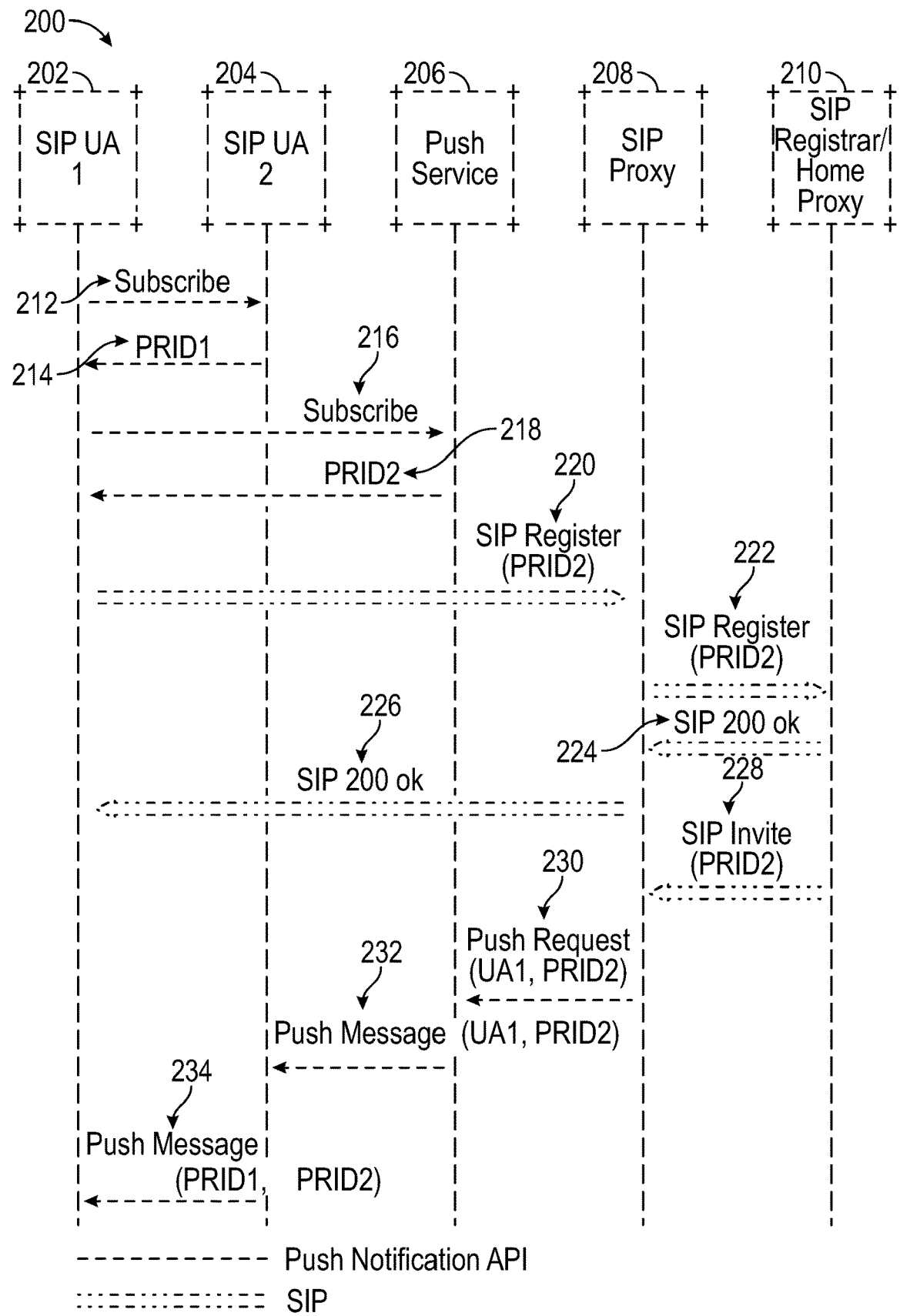
FIG. 2 is a timing diagram which illustrates push based wake up messaging methods which may be sidelink based.

FIG. 2 is a timing diagram which illustrates push based wake up messaging methods which may be sidelink based. FIG. 2 shows a SIP UA 1 202, SIP UA 2 204, push service 206, SIP proxy 208 and SIP Registrar/home proxy 210. A SIP UA 1 202 may subscribe 212 to SIP UA 2 204 and receive a PRID1 214. The SIP UA 1 202 may subscribe 216 to a push service 206 and receive a PRID2 218. The UA may send a SIP REGISTER request 220 with the PRID2 to the SIP Proxy 208 who forwards 222 the register request to a home proxy. A SIP 200 224 may follow and be provided 226 to the SIP UA 1 202. When the SIP UA 1 202 is to be woken up, a SIP invite 228 is provided to the SIP proxy 208, who sends a push request 230 indicating UA1 and the PRID2 to a SIP UA 2 204. A push message 232 is sent from the push service 206 and the SIP UA 2 204 sends the push message 234 comprising the UA1 indicator and the PRID2 to SIP UA 1 202. In this way, a UA may be pushed a message having a PRID via a sidelink connection only. Because of this, the first UE need only monitor a sidelink channel and can subsequently turn on a long range (3GPP, WLAN, etc) transceiver.

SIP and IMS capabilities may be augmented by application specific capabilities. Non-cellular application based messaging protocols do not necessarily correlate to cellular protocols. For example, cellular standards may not keep up with each new application released since many chat applications are brought online and never take off. Further, popular instant messaging protocols have functions that differ from standard protocols and may have no desire to rely on lower tech standardized protocols. However, users desire a unified messaging format. Example companies publishing chat applications include: WhatsApp, WeChat, QQ Messenger, Viber, Line, Snapchat, KakaoTalk, Google Hangouts, Blackberry Messenger, Signal, Telegram, Zalo, Facebook Messenger, Twitter messenger. Supported and installed application may be reported via SIP registration requests or other messages. Assuming two UEs agree to share lists of installed applications, then each UE may receive a list of another UEs supported apps from an app server or cellular server.

A request/response protocol which may be 3gpp standardized may be implemented for use by the applications. For example, a transmitting UE may transmit a request in any application layer protocol for a capability inquiry of another device. The request may be in the application protocol which already has been established.

1. UE1→UE2 sends application specific message. For example, "Hello Bob."
2. UE2→UE1 responds. For example, "Hi Jane."
3. UE1→requests capability report of UE2 via an App message.
4. UE2 accepts capability report and UE2 forwards the capability report to UE1 over the application specific protocol. A Capability report may be include all SIP and IMS capabilities of the device as well as a list of applications and app versions of the supported installed apps and user handles, phone numbers and the like associated with those apps.
5. UE1 maintains a table of capabilities and apps of UE2.
6. User of UE1 creates a message on an app and sends message to UE2. If a delivery confirmation message is returned, UE1 updates a timestamp with a last successfully transmitted message to UE2. If a message is not received within a time threshold, UE1 may repeat the message over another App. The another App may be selected based on the data and priority of the data used. The selection may consider a last timestamp of the another App. For example, if a plurality of app or app versions support a given protocol, if a user is determined to be unavailable for one selected app, then the client device may select another app supportive of the given protocol. An operating system may maintain a list of application and application versions which support a given protocol.

In some embodiments, capability requests/reports may be handled via an operating system which sends the request and report messages over a standardized protocol. For example, an app may request capabilities of another device and an identifier and other information corresponding to the requested capabilities may be sent to a network server. A response may be provided in return.

Alternatively, or in combination, the app may provide the request directly to a cellular network server via standardized protocols including SIP or IMS etc.

Figure 3:
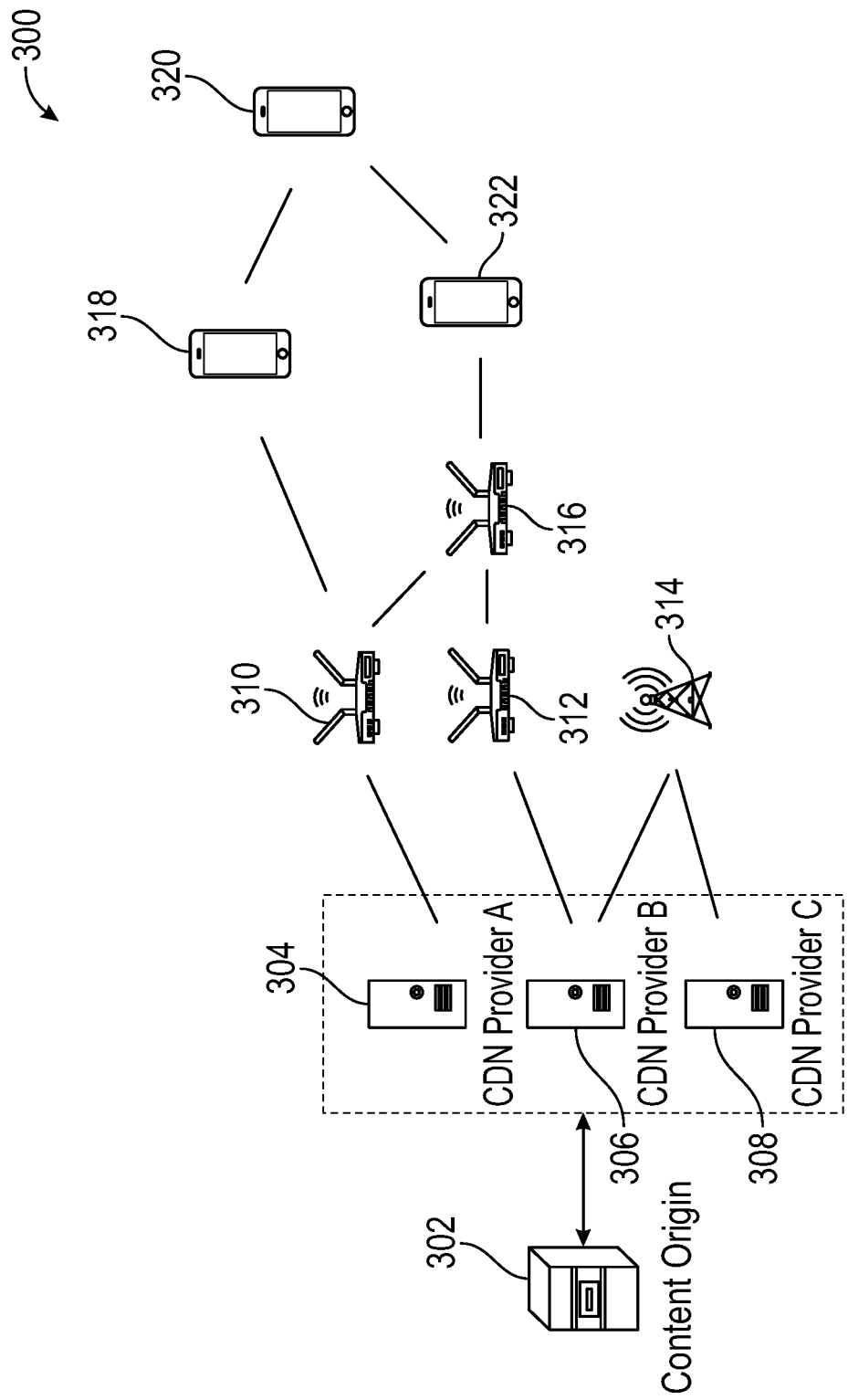
FIG. 3 illustrates a scenario in which a single content origin server is serving content to three different devices via three different content distribution network (CDN) providers.

FIG. 3 illustrates a scenario in which a single content origin server 302 is serving content to three different UEs 318-322 via three different CDN providers (A, B and C) 304-308. CDN A 304 provides content to a first AP 310, CDN provider B 306 provides content to a second AP 312 and a base station 314; and CDN provider C 308 provides content to the base station 314 as well. The base station 314 may detect, via a configured bit or string in a header portion of the data content, that same data is being retrieved more than once (from CDN provider B 306 and CDN provided C 308). The base station 314 may inform CDN provider B 306 and CDN provider C 308 of the duplication via HTTP or another application layer protocol. The base station 314 may use lower level protocols, for example, if either CDN operates on a cellular core network. AP 316 may be receiving content duplicated via AP 310 and AP 312. The AP 316 may notify either AP of the duplication. The informing may be done via unicast, multicast or broadcast. In some embodiments, APs and other network elements may report support for unicast, multicast or broadcast via capability identifiers, ANQP elements or by beacon frames, probe response frames, protocol data units (PDUs) or the like. ANQP elements may be used to indicate a capability of any one of the features disclosed herein. APs and STAs may be configured to proactively cache content depending on a capability to do so. A single UE may be served by one or more relays, each relay serving multiple UEs. Each relay may serve a same or different content of the cache.

Caching may be performed at any node herein, for example, a UE, STA, BS, AP, TRP etc. A support for caching may be reported by and to devices. A node may determine whether to cache a file or content based on it's perceived relevance in terms of times accessed, its QoS parameters, a number of stas in a cell or direction requesting access or the like. Instead of directly caching content, a base station or other device may store in a cache table a most recent UE (or list of ordered most recent UEs) who recently received the cached content. Caching devices may be intermediaries in end-to-end file transfer. In embodiments, this caching may apply to multiple UEs. For example, a base station may cache a UE who received a cached object. The UE may cache another UE identifier who received the object via sidelink. This way, a base station may request from a first UE the cached object when it receives a request from a different UE. If the first UE does not have the object, the first UE may request from another UE who it provided the object to. The object may then be passed back to the base station. The base station may signal a request for an object in terms of a breadth first search or depth first search. In this way, UEs may know when to stop requesting the object. If the BS determines that a UE went out of range in a direction, the BS may cache a nearby base station ID for requesting the object. Thus another BS may query its UEs for an object on request. Requests from BS→BS may be wireless, wired or a combination of the two, for example, requests may be sent on both. Requesting cache contents may be limited to underlay BSs from an overlay BS or overlay BSs from an underlay BS. Alternatively, underlay BSs may request the content object from one another or overlay BSs may pass requests. Cache requests sent wirelessly may be provided before, during or after a request is provided to the original content store, i.e. like the original request was made. Caching may be employed for control parameters as well as data content.

Figure 4:
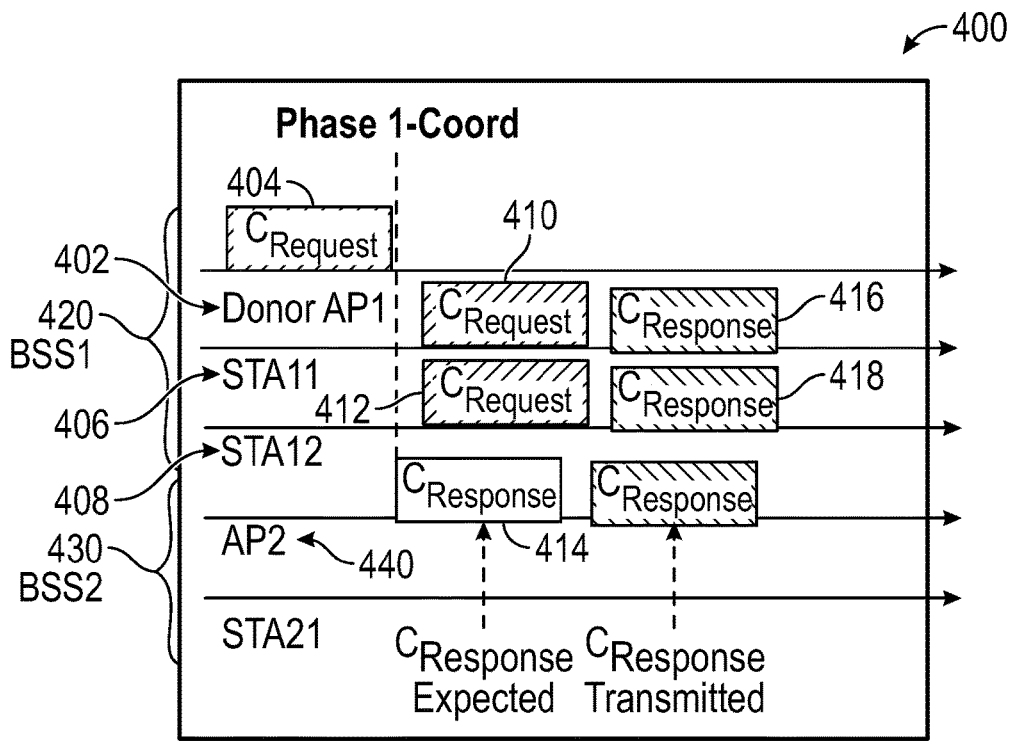
FIG. 4 illustrates a coordination diagram which illustrates example coordination transmissions.

STAs or UEs may act as relays between transmitters. For example, FIG. 4 illustrates a coordination diagram which illustrates example coordination transmissions. In an embodiment, an AP may transmit a coordination request (Crequest) which is not heard by another AP. STA11 406 AND sta12 408 within the BSS1 420 may detect no coordination response (Cresponse) and may rebroadcast the Crequest 410, 412. Once the AP2 440 hears the Crequest rebroadcasted 410, 412 by STA11 406 and/or STA12 408, the AP2 440 sends a Cresponse 414 which may be appropriately forwarded 416, 418 by STA11 406 and/or STA12 408 as needed.

Figure 5:
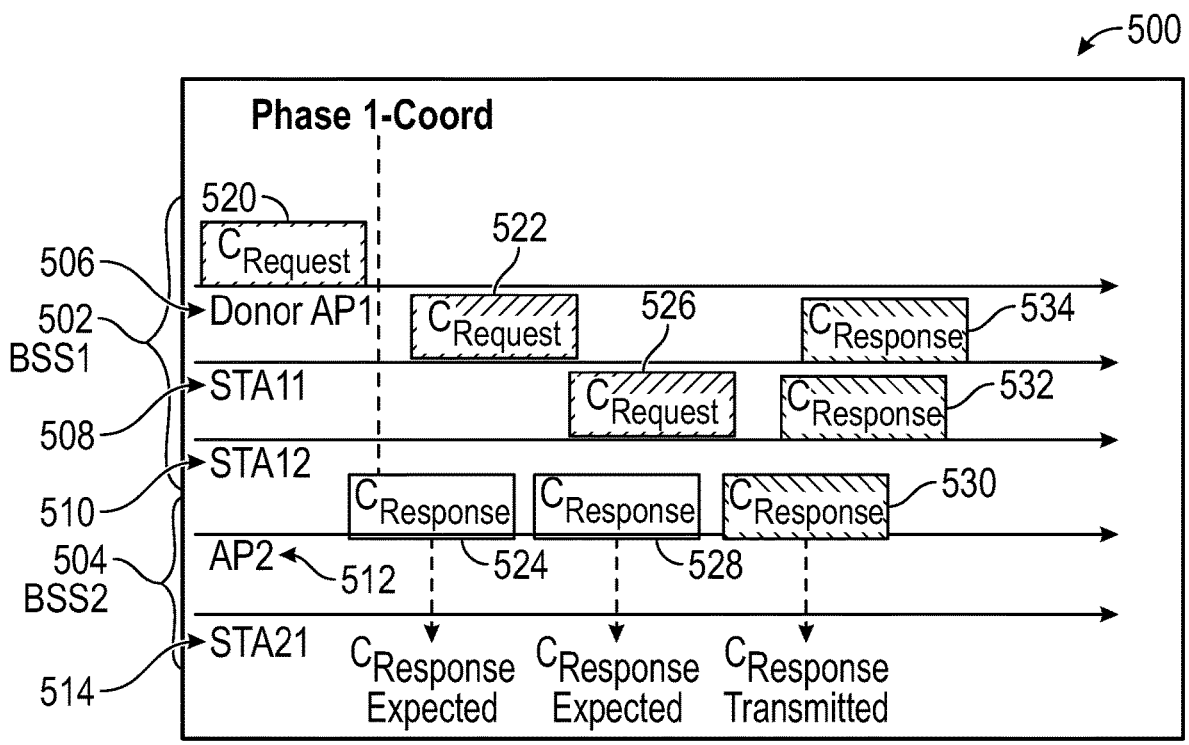
FIG. 5 illustrates a cascade transmit diagram.

FIG. 5 illustrates a cascade transmit diagram. FIG. 5 shows two BSSs BSS1 502 and BSS2 504. STA11 508 and STA12 510 may be configured to cascade transmit, for example, only retransmit the coordination transmission one at a time. This may be accomplished by including a cascade indicator or sta order indicator in the Crequest frame 520. Thus, STA11 508 may first broadcast a Cresponse 522, followed by a Cresponse 526 by STA12 510 if a Cresponse 524 is not heard by the STAs. AP2 512 may continue transmitting Cresponses 528, 530. STA11 508 may transmit a Cresponse 534 and STA12 may transmit a Cresponse 532.

An order indicator may be a bitmap including STAs in a BSS or may be an indicator for STAs only in a certain direction. In any event, a group id may be included which may signal a subset of STAs who should participate in the coordination effort. Coordination may be performed for sounding purposes, thus frames may include sounding information. Alternatively, or in combination, coordination frames may be used for data transmission and scheduling, for sidelink type transmission scheduling. Coordination frames may include any parameter disclosed herein. Cascading power transmissions may be employed, similar to those disclosed in U.S. application Ser. No. 16/421,034, disclosed by reference herein.

Some links may be radio over fiber links. However, some scenarios are shown in FIG. 3 in which communication between devices is wireless only. For example, the right most AP may receive same content from both left most APs. The APs may be informed of the forwarding loop via a beacon frame, management frame, control frame or the like assuming both APs operate on a same protocol. The APs may exchange a capability to detect loops which may occur. Loops may also occur when UEs are connected via sidelink in a peer to peer fashion. When a UE detects a loop, the UE may report the incident via PHY, MAC, RLC or PDCP signaling either over the sidelink channel or to the network directly. Reports may also be sent to a CDN directly if the UE, AP or base station knows the CDN ID. Loops may occur in part due to a UE or network device which has a plurality of SIM cards. A UE may report a capability to report looping when a plurality of SIM cards are supported or configured UEs may be MIMO or multiuser multiple input single output (MISO) capable.

STAs may acknowledge transmissions on one or more of potential downlink links to the STA. For example, if a STA is receiving data on two links, the links may provide the same data in duplicate, or the links may provide different data. Links may be orthogonal. Links may be transmission links and links may be reception links. Links may be fronthaul or backhaul links. Some links may have a primary channel and secondary channel. Other links may have a single primary channel. Links may be links of each one of a plurality of SIM cards. A link capability may be reported, for example, devices may announce (broadcast, unicast, or multicast) link capability information. An ACK may be provided for all data received over a time period on either link. An ACK may be provided on one link only or no ACK may be provided at all. The AP may establish a block ack agreement type and request ACKs from the STAs. The block ack agreement may apply to data transmitted on the uplink (to other STAs or to the AP) as well. Block ACK agreements may specify band, bandwidth, time etc for block ack transmissions. In some embodiments, response messages may be based on an initial transmission and thus no separate ACK need be provided. Link attributes and details may be advertised in any transmitted frame, for example, a beacon frame, an NDP frame an advertisement frame or the like.

Block Ack or other ACK frames may be segmented into different types. In an embodiment, a block ack frame may be a normal-block ACK or a link adaptation block ack frame. The link adaptation block ACK frame comprises information like suggested MCS, suggested beam information or the like. Because the link adaptation block ACK frame is larger than the normal-block ACK frame, it may not be desirable to use the link adaptation type frame at every ack transmission. For example, STAs may negotiate a pattern for providing link adaptation frames. The pattern may be specified in beacon frames or in data frames preceding the block ACK frame. The pattern may be altered by providing a link adaptation suggestion frame by the frame providing ACKS. For example, the link adaptation suggestion frame may suggest a frequency for providing MCS feedback for a duration or period. Other parameters herein may be used for link adaptation and may be negotiated accordingly. Link adaptation frames may be determined to be used based on network congestion, for example, for high data rate application in high network congestion, link adaptation frames may be used, while for low data rate applications link adaptation frames may not be used (or vice versa). Link adaptation block ACK frames may be used for shared/sharing transmissions of multi-AP transmissions.

A capability to participate in link adaptation block ACKs may be determined based on advertised capability and/or release version. STAs may determine based on the link adaptation parameters that link adaptation frames need not be used and should revert to normal block ACK frame types or other frame types. In an embodiment, when two transmitting joint APs, one which supports link adaptation block ACK frames and another which does not, then the link adaptation block ACK frame may not be used.

Networks (public or non public networks) may use artificial intelligence algorithms for loop detection, for example, via machine learning or other AI techniques and AI algorithms. AI algorithms include bayes theorem, decision trees, machine learning, genetic algorithms, expert systems, regression, generative adversarial networks (GANs), regression, Markoff chain, monte carlo methods, neural networks, reinforcement learning algorithms among others. In some embodiments, aspects of RAN networks may be reconfigured via an AI algorithm. In some embodiments, routes may be rerouted based on previous analysis via neural network training. In other embodiments, entire nodes including base stations and relay stations may power down or limit frequency or time usage. In some embodiments, UEs will limit base station access via neural network training information. In some embodiments, based on neural network training, a UE may be configured to transmit or receive only at a given QoS. Neural network or other AI information or training data may be received by a device via PHY, MAC, RLC, PDCP, RRC layer or other layer signaling.

Base stations may vary or alter a number of beams, beam width, subcarrier spacing, frequency use, and the like via a neural network which may be trained. In an embodiment, an untrained base station may initially transmit a number of SSBs, for example, based on transmitter type, altitude, location, number of SSBs within an interval, SSB index, direction etc. The base station may receive one or more of channel quality information (CQI), precoding matrix indicator (PMI) CSI-RS Resource Indicator (CRI) SS/PBCH Resource Block Indicator, layer indicator LI, rank indicator (RI) an/or L1-RSRP from each UE in range. The base station may then determine UE location and how scattered the UEs are, based on the received feedback. The base station may provide the feedback information to the neural network and operate the cell as may be preprogramed to. Given some training data, the base station may process the UE feedback and location information in order to determine how to accurately adapt beam width, number of beams, subcarrier spacing, allocation type, etc. to match the number of UEs accordingly. A base station may receive neighbor reports from same RAT or different RAT base stations to input into the neural network. Training data may comprise similar data.

Base stations may be able to predict load increases. For example, a base station may learn that at a given interval, a train will pass through or enter it's cell. In this way, a base station may allocate more resources for those users about to enter the cell and perform random access. The base station may limit frequency/time resources to other users within the cell for the period just before the train should enter. The base station may predict, via communication with other previous base stations, if a train is delayed and thus may delay allocating additional resources for random access or other transmissions. A satellite may perform a similar function, i.e. by understanding previous traffic conditions based on time of day, day of week, holiday, and the like, the satellite may allocate or change resources accordingly. Base stations may exchange neural network training information. For example, a base station may rely on training data sets of another base station and may discount the training set based on providing base station type, location distance or the like. Training sets may be established based on any network information disclosed herein.

Neural networks may be used for sounding reference signal transmission frequency, beam management decision making, measurement report taking/triggering, mobility determination, user density analysis, indoor/outdoor decision making, MCS and other coding decision making, HARQ ACK transmission or dropping and the like. Neural networks may be used to assess link load and link likelihood of use at a certain day, hour, minute etc. for a plurality of AP users (STA devices). For example, if there are no users at a given time of the day, for example, during work hours, the AP may decide to cull some links or power down altogether and wake up at a time with which a user is expected to be home. This may be performed during an observation step.

Figure 6:
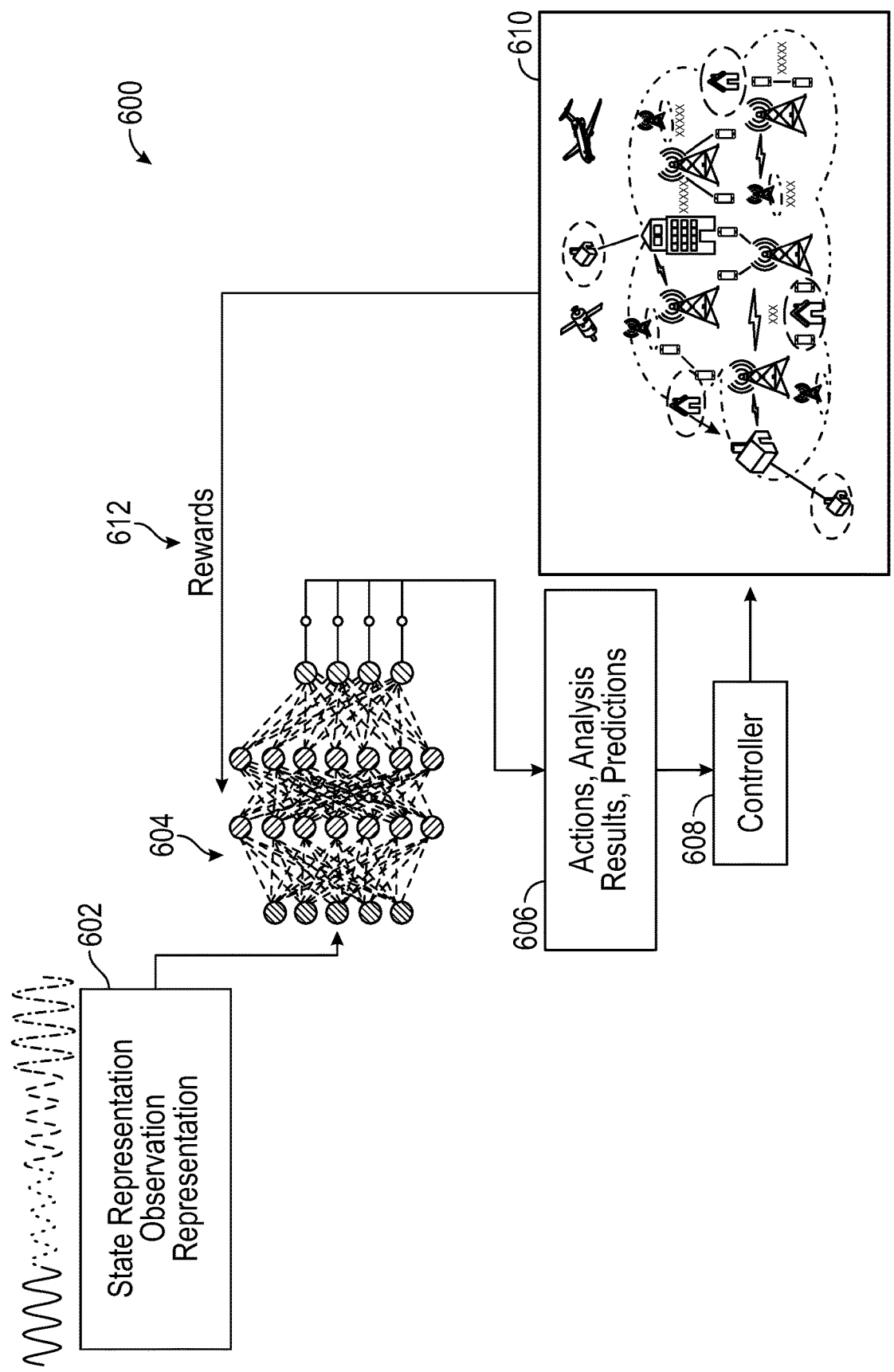
FIG. 6 illustrates artificial intelligence (AI) techniques which may be employed to observe a state representation or observation representation.

FIG. 6 illustrates artificial intelligence (AI) techniques which may be employed to observe a state representation or observation representation. A state representation or observation representation 602 may be gathered and stored in an accessible format. A neural network 604 may be used to determine actions to perform, determine results of potential actions and make predictions 606. This information may be fed to a network controller 608 which interfaces with one or more network elements of a radio access network 610 to control that element and/or the network as a whole. Reward information 612 may be fed back to the neural network. For example, AI techniques may be used to determine a number of CUs and/or DUs to deploy or instantiate or a network split type or level. Information fed into the neural network may be based on key performance indicators (KPIs), for example, KPIs based on UE type (mobile UE, handheld UE, car, train, bus, etc.).

A state representation of a UE may include an RRC state, for example, IDLE, CONNECTED and INACTIVE states and/or a transition between each state. State information of a network node, for example, a base station may include a state determined by what the node is currently transmitting, for example, system information, synchronization (PSS, SSS), user data, control data or the like. Other state information may be determined via instructions to a UE including carrier aggregation instructions (add, release or the like), handover, dual connectivity, configuration of radio bearers. State information may include information from measurement reports from UEs and/or other base stations or other nodes.

State information may or may not include information reported by UEs, for example, control information. State information may include a numerology (symbol duration, slot duration, number of OFDM symbols) for a UE(s), bandwidth, modulation, power level (for example via transmit power control (TPC) commands), channel state information or the like. State information may be based on the size of the cell, the state of the cell (overloaded vs. empty). State information may consider CQI reported, SRS reported and/or may consider the flexibility of SRS based on a mode of the UE. State information may consider whether a UE is accessing URLLC services, eMBB services or eMTC services. Location, power and signal strength may be considered. State information may relate to user location derived from position and/or an estimated pathloss.

The controller may signal resources for a base station to use and to provide to UEs for sidelink usage. For example, the controller may schedule and set up links based on location distance and pathloss. Sidelink may be for safety messages, or the like. The controller may suggest to a UE to upgrade software or switch routing or transmission/reception protocols. Backward compatibility may be supported. The controller may make suggestions on transmit/receive diversity based on a reported capability of a UE. In this way, the capability of a plurality of UEs in a location may be viewed in terms of state representation for input to a neural network. Capabilities include any capability herein as well as a space-time coding capability or space division multiplexing (SDM) capability, precoding capability, MIMO capability non orthogonal multiple access (NOMA) capability or the like. Capabilities may be indicated via a PHY or MAC header. For example, a capability ID may be indicated in the header section. Further, a UE may be capable of accessing a relay, transmitting in an ad-hoc fashion or accessing a particular base station. This information may be indicated in a capability identifier and supplied to a network accordingly. Based on this information, the controller may schedule or direct UEs or STAs accordingly.

Scheduling of users within a cell may encompass QoE which relates to more than simply network related QoS. For example, QoE includes buffering events, interruptions, stalled video playback, and the like. QoE may be based on file type, for example, video, audio, ftp type download, whether synchronous vs. asynchronous etc. Users may not perform QoE tasks, rather information on playback, interruptions, etc may be discovered by the sender implicitly or provided explicitly from the UE in feedback frames or other data frames. QoE feedback may be provided to a network server or network node via serving side based on acknowledgements and timeliness feedback. A server may be located remote (outside network/another network) or at network edge. Scheduling decisions may be based on QoS and QoE of users within cell and users outside of cell.

Software upgrades and/or remote programming may be performed wirelessly. For example, a device such as a microprocessor, FPGA etc may have it's own local wireless adapter which may be toggled via a switch or burn in fuse. Initially, the fuse may be in such a position where programming is available, and then the fuse may be closed to subsequent wireless programming before a device is field deployed so as to avoid reprogramming by a malicious user. In an embodiment, the wireless receiver operating on chip or on board may be a Bluetooth or Wi-Fi compatible device. Alternatively, the chip may be precoded with instructions for receiving programming instructions based on an onboard Wi-Fi adapter or other adapter, for, example using a network on chip architecture. A remote device may provide software write instructions, Joint Test Action Group (jtag) instructions/commands, register reading and writing, breakpoint setting and the like. Wireless JTAG devices may encapsulate JTAG protocol, for example, by providing clock signaling or other timing information. In embodiments, devices may indicate or broadcast a capability to support wireless debugging. A hardwired button press may be enabled to signal debugging pairing. Authentication parameters for wireless debugging may be based on a hardware identifier or a debugger or chipset, a 3gpp parameter or other telco parameter or any parameter herein for that matter.

DCI Control format 2_7 or another DCI format may be used to indicate a flexible SRS assignment and may further indicate coverage and capacity parameters. DCI format 2_8 or another DCI format may be used to indicate multiple TRP scheduling parameters. In embodiments, mTRP scheduling parameters may include flexible SRS indicators. Scheduling may be performed in accordance with an adaptive network bitrate or an adaptive modulation scheme, based on throughput and/or signal to noise or the like. Capabilities may be specified in terms of link support levels, for example, a number of links on the receive side and a number of links supported on the transmit side. Capabilities may be simultaneous in nature, for example, a total of X links supported, wherein X=A+B, wherein A=receive capabilities and B=transmit capabilities.

A UE may perform provisioning over a sidelink or v2x relay, for example, if the UE does not have another network access path. The UE may receive from another UE a list of bootstrap servers, a list of server trust anchors and a list of trust anchor references. The UE may be configured with a list of UD IDs for which the UE may reach out to in an effort for obtain this information. The UE may, instead of retrieving information from a bootstrap server directly, request a sidelink UE to obtain bootstrap information on its behalf. In this way, the bootstrapping UE may not need to know the list of bootstrap servers, list of server trust anchors and a list of trust anchor references and may rely on another to obtain bootstrap information. A UE may receive sidelink DCI on DCI formats 3_2 or 3_3.

The UE may be configured with security information (keys, certificates or the like) of another UE accessible via sidelink and may authenticate the another UE. The UE may be configured with a group ID or other ID instead of a single UE ID.

Security may be employed via physical layer, MAC layer or higher layer security procedures. Using physical layer procedures, for example, a cryptographic key or set of cryptographic keys may be derived via channel state information (CSI), beam forming information, channel statistics or other channel characteristics gleamed from measurements taken on a channel. These channel characteristics may be determined from beacon signals transmitted by an access point or via scheduled or unscheduled transmissions made by a STA. Other methods of employing physical layer security include an addition of random noise into a data transmission to degrade detection ability.

Physical layer security may be relevant with respect to V2X or D2D type device communication. A cellular network may provide parameters to aid in V2X type communication, including for example, a physical layer security algorithm to be employed, physical layer capabilities of one or more devices within a given area, modulation and coding methods for augmented security, frequency hopping and spread spectrum parameters for example, a hopping scheme or resource pool.

Physical layer security may be employed in traditional RF type transmissions and may also be employed in light based transmissions (infrared, visible light spectrum). One physical layer security technique may involve determining that a transmission by a user is at a higher receive power than expected. In this case, a malicious user may be attempting to deceive a receiving device into thinking that the malicious user is legitimate. Receiving the higher strength signal despite not signaling a TPC command instructing an increase is an indication that a malicious user has attempted an attack. Once a malicious attempt has been considered, devices may rely on other devices with known location, signal, beam, power etc. to verify whether the malicious device is who he claims to be. This may be done by group based (for example, joint transmission messages to the malicious user or single user verification messages. Response times may be calculated via response messages to the verification messages. If the response time is not appropriate, not timely or the malicious user fails to respond to a challenge correctly, one or more devices of the network may determine that the malicious user is malicious and thus disallow transmissions/receptions.

Hopping schemes may me applicable on uplink, downlink, direct link or sidelink. A UE or STA may be configured to report a capability to support various schemes, for example, time, frequency or space hopping schemes. In the downlink, an AP or BS may convey a hopping pattern for subsequent transmissions. The transmissions may follow, without the need for the pattern to be conveyed, subsequently. The transmissions may be repetitions of a same data unit or may be new data. In some examples, a portion of a transmission may be repeated thus indicating that the repeated transmission is a repeat.

In an embodiment, a UE may continuously transmit a data and/or control signal over a plurality of slots/subframes. The UE may not perform frequency hopping, for example, the UE may transmit on same frequency resources over the plurality of slots based on RRC or other layer signaling. The UE may receive, in RRC, a number of slots to monitor prior to switching to another frequency. For example, when n=1, the UE will monitor one slot prior to a switch in frequency occurring. n may be provided via RRC, MAC or DCI. The UE may request to configure n based on capabilities. N may be a number more granular than slot leve, for example, n may be symbol specific such that frequency hopping may be employed within a slot. A number of hops per symbol, subframe etc, may be associated with UE capability and/or negotiated with the network.

In embodiments, a cryptographic identifier, for example, a SHA code may precede a data portion thus indicating that a transmission is repeated. Alternatively, or in combination, when a transmission occurs within a given time/frequency or beam space, from an earlier transmission, a receiving STA may consider the reception a repetition. In some examples, only a portion of the data may be repeated, for example, by a dedicated repeater device. In the uplink, APs or BSs may use trigger frames to convey resources for uplink transmission by STAs. Patterns may be used to trigger uplink data, for example, a trigger frame may trigger frames over 1 or 2 time intervals. Alternatively, a trigger frame may be transmitted after every X uplink transmissions. Uplink or downlink data may be a mix of persistent data and periodic data. Trigger frames may be transmitted at lower data rates or coding rates than the subsequent data frames.

The trigger frame may indicate whether the frame is triggering persistent or periodic data. The trigger frame may indicate a QoS, resource allocation, (type, space or time frequency pattern type or format). If the trigger frame indicates a hopping schedule, the schedule may indicate a pattern to each STA, based on the STA order within a group or the STAs physical identifier, etc. An AP may change the pattern at each uplink transmission or the pattern may be changed every X transmission intervals. The space, time or frequency that a STA uses on uplink may be indicated in the trigger frame or the AP may preconfigure the STAs within a group with the patterns and then use the trigger frames to indicate which pattern to use. STAs may implicitly determine when to receive acknowledgements. For example, a broadcast ACK or MU-ACK. Patterns may involve scheduling resources or resource units to more than 1 STA or a single STA may be configured with multiple resource units. A STA may determine when to receive an acknowledgement based on previous ack responses. For congestion control purposes, if acks are continuously positive, the STA may receive larger size block ACKs less frequently than if frames are regularly NACKed and require retransmission by the source. This may aid in congestion control, i.e., the number of transmitted frames may be increased before an ACK is received. Block acks may increase in size, thus become delayed, as the channel conditions improve (or stay positive). Delayed ACKs may become relevant based on a QoS or latency of triggered data transmissions.

The trigger type may implicitly indicate a number of uplink transmissions to occur prior to transmission of a subsequent trigger (for more uplink transmissions). In a method, a trigger type subfield may be set to a value between 8 and 15, for example, using binary equivalents [1000], [1001], [1010], [1011], [1100], [1101], [1110], [1111]. Each value may represent a different pattern, set of patterns, pattern offset, pattern hopping, pattern sequence, acknowledgement type, HARQ/ACK type, data, control, UL beamforming (hybrid, analog, digital) training request, UL csi training request or a combination of these. Some values may specify certain power modes, for example, low medium or high power modes. Alternatively, a value greater than 15 may be used. A pattern may be indicated in part by the number of users indicated by the trigger frame. Triggers may be used to request feedback which may be time, frequency or space based. Feedback opportunities, or the desire to transmit feedback, may be based on a degree of UE autonomy, isolation and/or security. Transmission opportunities, for example, feedback opportunities may further be based on service continuity, for example, a type of service continuity.

Trigger frames may indicate resources for sidelink or direct link between STAs. A trigger frame may be provided to STAs, of which some STAs are direct link STAs, some are uplink STAs and some are downlink STAs. Using MU-MIMO and/or OFDMA, the STAs may transmit and receive simultaneously, for example, on a same link or on different links, for example, to multiple receivers or a single receiver.

Figure 7:
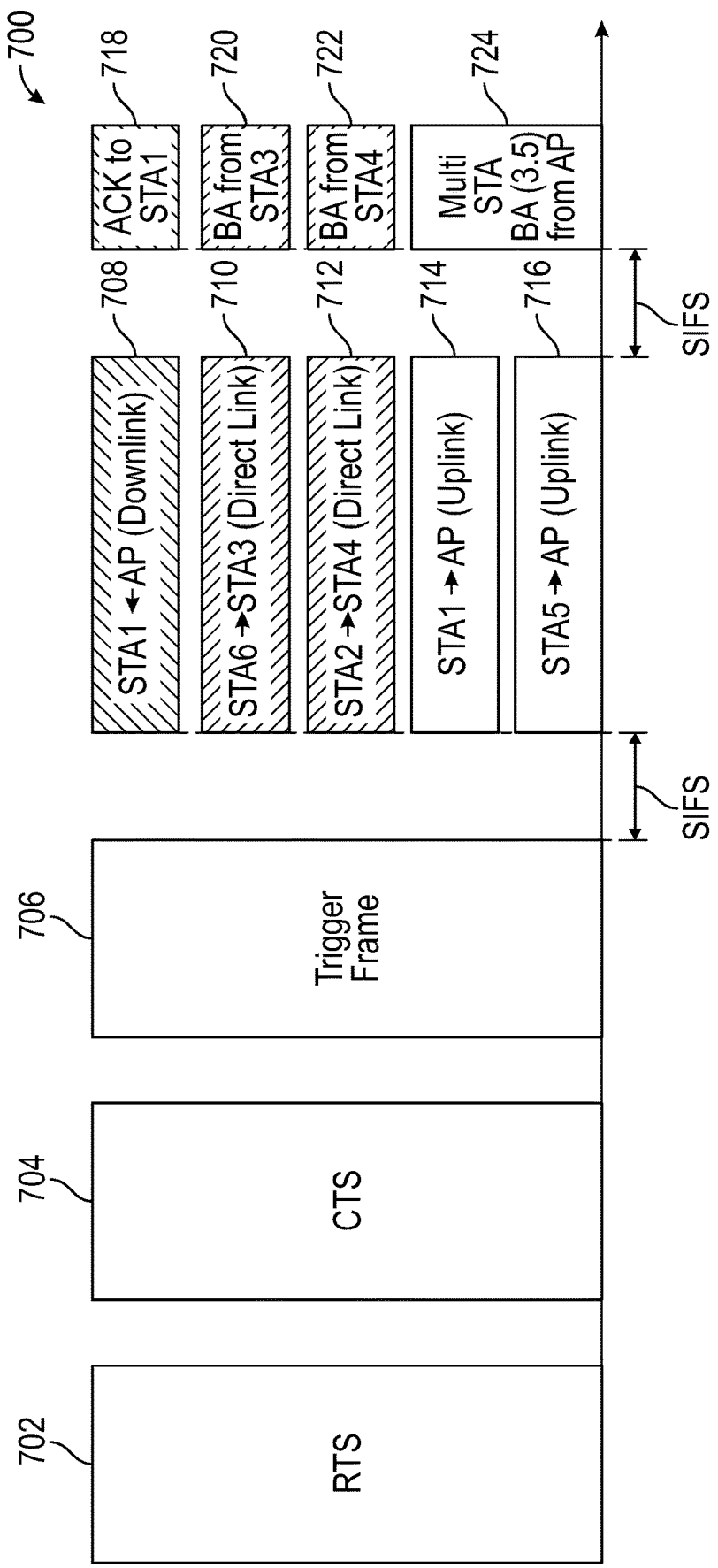
FIG. 7 illustrates that request to send (RTS)/clear to send (CTS) frames may specify a duration including the CTS, trigger, uplink/directlink/downlink data unit(s), acknowledgements (ACKs) and short interframe spacings (SIFs)

FIG. 7 illustrates that RTS/CTS frames may specify a duration including the CTS, trigger, uplink/directlink/downlink PPDU(s), ACKs and SIFs. The RTS/CTS 702, 704 may indicate that direct link transmissions are to follow. The trigger frame 706 may specify one or more: MCS indicators, STA identifiers, special assignment, frequency assignment, timing assignment, block ack types, resources for acknowledgement, resource pool information for direct link assignments or the like. In an example, the trigger frame 706 triggers a downlink transmission 708 from an AP to a STA; a direct link transmission 710 from a STA to another STA; a direct link transmission 712 from another STA to another STA; an uplink transmission 714 from a STA to an AP; and an uplink transmission 716 from another STA to one or more APs. Acknowledgement frames 718-724 are also scheduled by the trigger frame in an embodiment.

Any frame shown in FIG. 7 may be transmitter or received simultaneously with a frame of another STA. For example, CTS frames may be provided simultaneously from STAs clearing the medium. RTS frames may be provided by the AP or STA. STA ID and link type may be indicated in the trigger frame as a bitmap. For example, a bit pattern specifying STA ID may precede bit pattern specifying link type, frequency etc.

Trigger or other resource grant messages or frames may indicate that some resources are resources of another access technology, for example, a light communication based access technology. In an example, the trigger frame may indicate whether resources are scheduled outside of a 160 mhz band, the trigger frame may indicate the access technology, for example the light type access technology. The trigger frame may indicate that a number of antennas, transmitters or light emitting diodes (LEDs) is greater than a number, for example greater than 2, 4, or 8. Trigger or other frames may specify light range in line of sight (LOS) or NLOS based topologies. Trigger frames may be transmitted from APs having broad coverage, for example, covering a plurality of LED transmitters and/or optical receivers. Trigger frames may specify duration fields so that light communication STAs may ignore transmissions for a duration, i.e. they may set a NAV for the duration.

Trigger frames may be of varying sizes. For example, a trigger frame which specifies a pattern for a plurality of users may precede a trigger frame which specifies a grant for a subset of the users or merely a change to the pattern. Trigger frames may be referred to by their bit length or occupancy time, i.e. some trigger frames may be shorter than or may convey less information than others. In an example, a transmission pattern may be provided to a plurality of STAs in a trigger frame. The trigger frame may include a random number to identify the trigger frame and subsequent UL or DL transmissions of the pattern. STAs may TX using the random identifier or a portion of the random identifier. Shortened trigger frames may be transmitted on a smaller portion of the frequency band, for example, a 20 mhz portion of a 40 mhz or larger band. The trigger may or may not be repeated in the other bands. In this way, STAs which may only operate on a band portion, may receive the trigger frame, and may act accordingly.

Trigger frames may indicate a cooperation pattern, for example, a pattern for a plurality of users to share information prior to cooperatively transmitting the combined set of information to the access point. The patterns may indicate resources for initial transmission among STAs, for retransmission among STAs and for subsequent retransmission to the AP. The patterns may change over time in the case of persistent uplink data transmission. Alternatively, the STAs need not transmit anything to the AP, rather the STAs may simply exchange information using the transmitted pattern. The AP may still indicate in a broadcast frame or other frame that the medium is busy for a duration. CSI information may follow trigger frames or may be provided by the STAs. The term STA and UE may be used interchangeably throughout this disclosure.

Patterns may be based on QoS of the uplink frames which is reported in buffer status reports or transmission requests. Patterns may be based on whether or not resources are determined available, for example, based on a LBT procedure or a plurality of LBTs performed in a band, subband or the like. Patterns may specify locations in time/frequency/space for which additional or sub-patterns may be transmitted. The sub-patterns may be or may indicate smaller or shorter patterns for UP/DL transmissions. Patterns may provide two way (or three way) resources, for example, UL, DL and SL resources, for example, in a same band or different band. Patterns may be forwarded or rebroadcasted in time/frequency/space by another AP or STA. Patterns may provide a transmission duration, for example, a duration per sector or duration per frequency or sub pattern. Patterns may indicate resources for control and data separately and may also be transmitted with pilot signals. Patterns may vary in size depending on whether or not HARQ is supported. For example, if HARQ is supported, patterns may schedule retransmission resources adaptively based on the need or based on CQI etc. DCI Control formats 3_4, 3_5 and 3_6 may include pattern information.

Patterns may be used for multi-AP transmissions, for example, transmissions from multiple APs to multiple STAs or from multiple STAs to multiple APs. Multi-AP transmissions may include a pattern frame which indicates when additional triggers, data frames, NDPs and feedback shall occur. For example, pattern transmissions may include periodic type instructions which may be for both downlink or uplink data, sounding frame transmissions to STAs followed by beamforming, CQI feedback or other feedback. Feedback may be quantized. Patterns may specify a group ID and/or order of transmissions of the STAs to one or more of the APs. Each AP may provide a group ID of which STAs may be members of. Group IDs may also be coordinated between the APs using management frames. In this way, when a group of APs signals a pattern, a single group ID may specify STAs of both APs. Pattern information may comprise reference signals, for example a sounding reference signal (SRS), phase tracking reference signals (PTRSs), pilot signals, data signals, discovery reference signals or the like. These signals may be associated with one another and/or transmitted with one another.

Group sounding procedures may reduce overhead. For example, a STA may perform sounding simultaneously with a plurality of APs and/or a plurality of other STAs. In an embodiment, a STA may receive a trigger frame indicating a STA ID, for example an association ID, transmitter ID, panel or association id/panel pair, or any combination of the same. In response, the STA may transmit on resources indicated in the trigger frame, for example, time, frequency beam resources. This transmission may be broadcast and overheard by other STAs, other APs, group transmitters, other relay STAs and other slave or master nodes (for example polling nodes) which are a given distance away. The transmissions may indicate a beam such that a receiver may derive a location of the transmitting STA. Receiving STAs may retransmit the received sounding information to other STAs based on STA movement, power, STA distance or the like. Instead of using multi-user transmission techniques, single user, for example, time delay type transmissions may occur where a STA receiving a trigger may delay based on an order or a time indicated in the trigger frame.

Transmissions, for example, UE base station(s) transmission(s) may be alined in time/frequency and not beam, for example, by using multiple spatial streams to transmit a data or control frame to the plurality of APs. This spatial stream determination may be discovered with or without receiving an indication by the APs who trigger the uplink transmission. For example, a STA may sample the trigger frame, or another frame immediately preceding or following the trigger and derive spatial stream information via beamforming or channel state detection procedures. This way, the AP(s) may also learn of a best beam(s) along with the uplink transmission by the STA(s).

APs may share a group of Traffic IDs, for example, an AP may schedule traffic to or receive traffic from a STA which shares a traffic ID with multiple APs. APs may negotiate the use of shared TID groupings which may be based on class, traffic type, STA type, capability of AP, capability of STA. The negotiation may be performed with sidelink (AP→AP) direct messages, via STA relays, via negotiation messages, via capability exchange messages, during association, during a security agreement/context or the like. Negotiation messages may also negotiate power, range, blanking intervals or no transmission opportunity times or frequencies. APs may indicate to STAs as to which AP and which link of the AP may be a best AP for the STA based on a STA request. APs may also do this via broadcast messaging which includes tables indicative of any parameter herein and a AP which may best handle that parameter, for example, a high data rate parameter, security parameter, fast link setup parameter or the like. Neighbor report messages may be used to indicate the sharing of TIDs, capabilities, etc. STAs which are non-mobile may indicate a preference to not receive neighbor reports. These STAs may determine to ignore the reports and/or not measure signals received from neighboring APs.

APs may be grouped according to capability, frequency, or other parameters that may be similar or dissimilar between the elements of the group. APs may be grouped, or identified as a group, by a STA looking to create a database of like APs. For example, a database of APs that are of a particular parameter, standard or the like.

Feedback may indicate group ID or may be directed to one or more of the APs. For example, when an AP transmits the trigger, sounding frame, NDP frame or other trigger, the STAs may implicitly transmit feedback to that transmitter or to another transmitter. NDP frames and data frames may be simultaneous or staggered, for example one follows another. If a single AP collects feedback, or acknowledgements, the AP may subsequently broadcast the information to APs within an area or multicast the feedback to APs of a group of APs. Pattern transmissions may indicate resources for the sharing of the feedback (narrowband or wideband) or acknowledgement messages. Pattern transmissions may have a dedicated 4 bit code to indicate transmission type. Furthermore, pattern transmissions of a certain type may also have dedicated 4 bit codes to indicate transmission type. Codes may be dedicated to feedback transmissions from sounding transmissions which originate from a certain AP or group of APs.

Physical layer security may or may not be applied to broadcast ACK type messages for v2x transmission. For example, there may or may not be a need to encrypt the broadcast ACK messages or portions thereof, for example, individual MAC address portions. In an embodiment, a broadcast ACK message may be transmitted to acknowledge receipt of one or more messages received from a v2x transmitter within a given period of time. The broadcast ACK may be periodic or aperiodic. The broadcast ACK may include or indicate MAC addresses (fixed or random), IP addresses, association IDs, 5G Globally Unique Temporary Identifiers (5G-GUTIs) or other address types which may be burned in addresses or assigned addresses. MAC address may return to a preset or hard coded value upon expiration of a timer or other event described herein. An IP address may be broadcast by an AP of a group of APs and the IP address may be dynamic or static as the STA is mobile. The broadcast ACK message may include an order format identifier which indicates the order of the MAC addresses. The order type may be based on channel state, RSSI, receive power level or the like. For example, the MAC addresses may be ordered from highest receive power to lowest receive power. This may provide an indication of distance and may indicate transmission power control information since a transmitter may recognize an availability to lower or increase power accordingly. In another embodiment, the broadcast ACK transmission may include a MAC or other address ordering based on location, beam or sector. This way a receiver of the broadcast ACK may order the receivers by location. Broadcast ACK messages may be transmitted in response to messages sent as disclosed herein. Based on whether or not a MAC address is found within the broadcast ACK, a transmitter may determine whether or not to retransmit an original message. In another embodiment, an ordering of MAC addresses based on time may convey a desire of the receiver to indicate a timing advance to the transmitter.

In an embodiment, a power aware forwarding technique may be used. For example, when an AP, relay or STA forwards a packet, the AP may denote the required transmission power by deducting a value accordingly from the packet header. This signals to a next relay in line that a certain power level has been used prior to that relay receiving the packet. If the relay detects the level below a threshold, the relay may drop the packet or provide an indicator to an earlier relay or sender up the chain.

The term UE may comprise a device used in electricity distribution or reception, robotic control (sender/receiver), a voice based device with microphone and speaker(s), an industrial sensor, a drone or drone controller including camera, display etc, an asset tracking device or asset tracker (for example, via temperature, vibration, motion, pressure or the like), a traffic light, street sign etc, construction equipment including tractor, crane and backhoe controls, and a high definition video display or recorder. Traditional type UEs may be handheld, arm held or positioned on a desktop. UEs and transmitting devices may have directional antennas and/or omnidirectional antennas. UEs may be incorporated into trains, planes and automobiles. Handheld controllers may include haptic controls such that human users may receive feedback accordingly. These controllers may include face sensors to detect the human users.

Antennas may be or may incorporate traditional cellular phone antennas, dual antennas, antenna panels, or the like. Antennas may take non traditional forms, for example, when incorporated on or with an optical component. In on embodiment, a lens or other optical component which transmits optical information may also incorporate an RF antenna. In an embodiment, an RF antenna may be implemented via concentric circles, parallel or perpendicular transmission elements either within or outside of the lens used for optical transmission or reception. In this way, a processor may correct for any optical output or optical reception errors due to the RF antenna element.

UEs may be capable of receiving 360 degree video feeds or streams that are streams of cloud based video games. The games may restrict the player to only viewing a certain portion of the feed at any given time, although it may be required to provide more than a player's instantaneous viewpoint at once. In one embodiment, in order to restrict a players viewpoint to a portion of the received video, a key may be provided which is used to decrypt only the portion for which should be visible and does not decrypt any other portion. In this way, if a player needs to change the visible portion, a new key may be requested.

In cloud gaming, uplink data may be prioritized over downlink data. Thus, classes of data may be organized for cloud type gaming. Uplink data comprising key strokes and player movement instructions may be of a higher QoS than downlink video/audio or uplink video/audio. QoS may be based on resolution, field of view (based on peripheral vs. central view importance), refresh rate, color/color contrast, interaction latency, for example, responsiveness. When a player transmits a request for a cloud gaming service, the player may be allocated to a network slice which provides or allocates network bandwidth according to the service. For example, for a gaming application which requires intense video on the downlink, the slice may provide a large downlink bandwidth with limited uplink bandwidth. For a game which requires limited downlink bandwidth, the slice may provide smaller downlink bandwidth. The user may request, in a BSR, a type of game or application traffic type being requested. For example, traffic types may include high bandwidth gaming, medium bandwidth gaming or low bandwidth gaming. In another embodiment, a network element may receive a gaming bandwidth type from a gaming server or cloud edge server which may indicate to the network the slice or bandwidth required for the user. Bandwidth type may also be based on user capability. For example, a user with an augmented or virtual reality display may request bandwidth as a type or capability of the display.

Systems may be employed for monitoring users or people. In an embodiment, a system may comprise a camera to take an image of the user for subsequent processing. The system may also send wireless RF signals throughout a space and capture information about the user via RF diffusion, penetration, reflection and other channel information. Systems may employ multiple antennas, for example, multiple TX/RX antenna pairs. Sharing of heat sensors and other sensors may be employed. Systems may monitor vital signs, for example, monitor babies (or people of other ages) for breathing and heartbeat. Systems may report capabilities for any one of the features disclosed herein, for example, an ability to track a number of users, an ability to check particular vital sign, or the like. People being monitored may or may not be wearing tags which include transceivers.

In an example, a UE may use RF diffusion, penetration or reflection to estimate a user's position in space relative to the UE and/or speakers of the UE. Having located the user position, audio signals produced by the speakers may be beamformed so as to provide audio spatial effects via, for example, side firing loudspeakers. Beam feedback may be provided as signals are received based on reception interest. Audio systems may incorporate DSPs which are components of a system on a chip (SoC). SoC components may include cellular transceiver chips, radio (audio) receivers, Bluetooth, wifi chips, amplifiers, and the like. SoCs may have circuitry configured to implement Active Noise Cancellation (ANC) among the various transceiver chips. If the SoC is dedicated to a vehicle, the SoC may comprise Engine Sound Enhancement (ESE) circuitry. ANC circuitry may receive sensor data from sensors throughout the vehicle, for example, engine sensors, transmission sensors, vehicle occupant sensors, wheel sensors etc. to make a determination as to handle noise cancellation.

Drones may perform warehouse automation tasks, for example, scanning items using RF, moving packages, etc under the guidance of warehouse lighting system transmitters which may be RF or may be visible light based transmitters. The VLC transmitters may turn on as requested by a drone or other device, for example, by sending a request-light transmission over RF and receiving a VLC or rf response. This may allow for only a subset of the lights to be on at any given instant. Modulation technologies for VLC include on off keying (OOK), Offset variable pulse width modulation (VPWM), Multilevel pulse position modulation (PPM), Inverted PPM, Subcarrier PPM, direct sequence spread spectrum (DSSS) and sequence inverse keying (SIK) modulation types. A light may detect the drone without using RF, for example, the drone may be detected via microphone (sound), heat, radar, etc. and may turn on the VLC at that instant providing the drone with both light and communication.

VLC transmitters may be used in combination with traditional radio transmitters to target augmented or virtual reality headset devices. Because these types of headsets require extreme quantities of data with minimal latency, it may be best to employ MIMO radio devices and VLC receivers (cameras) on the headsets. In this way, massive data reception may be employed for example in an office setting where each user has access to one or more lamps providing VLC, however the RF spectrum is shared among the office. The VLC transmitters may be coupled to relays/servers for providing data to the headset devices.

VLC may be used for V2X communication. For example, cameras mounted on cars may be able to ciew surroundings and also detect information modulated via other cars headlights, brake lights or other lights.

Digital signal processors may be used for controlling and driving audio systems, including amplifiers, loudspeakers, headphones and the like. DSP algorithms may correct or compensate audio signals in real time, for example, echo cancellation or echo suppression. Background sound or background noise may be suppressed. This may be achieved using beamforming and microphone arrays, located on the front, side or back of a cellular telephone or handheld device. Beamforming techniques may be used to locate objects, for example, by performing rotary type beam transmission and measuring characteristics of a receive beam. Object location may be performed sequentially, i.e. the object being located may be grossly located, for example, using RF beamforming and then finely located by adjusting a camera which may record an object, person, or the like. The camera may also be adjusted using the RF beamforming process so as to form a feedback loop.

A UE or base station may indicate a switch or change in modulation type. The switch may be an indication in any frame or frame portion herein. Modulation types which support a switch may include: Wavelength Division Multiplexing (WDM); Pulse Width Modulation (PWM); Phase Shift Keying; Under-sampled Differential Phase Shift On-Off Keying (UDPSOOK); On-Off Keying (OOK); Binary Phase Shift Keying (BPSK), Quadrature Phase Shift Keying (QPSK), Color shift keying (CSK); Under-sampled Frequency Shift On-Off Keying (UFSOOK); Under-Sampled Quadrature Amplitude Modulation with Subcarrier Modulation (UQAMSM); 16QAM; 64QAM; 128QAM; 256QAM; 512QAM/1024QAM; 2048QAM; 4096QAM; Hybrid OOK-PWM; Spatially-Modulated Space-Time (SM-ST); Layered Space-Time Code (L-STC); Spatial-Temporal Complementary Frames (S-TCF); Pixel translucency modulation; Spatial Discrete Multitone (SDMT). PDUs may indicate modulation scheme, transmit power level, BSS color, direction, ranging parameters, CRC data format, MCS or other coding, bandwidth, phase, RAT version or power threshold in a preamble. Power level or threshold may be used by a receiver to set a power level (max or min) so to be configured to transmit concurrently. A network may determine to switch to QAM modulation from another modulation and vice versa based on reporting/receiving a report of a level of phase noise.

A UE may have or may be assigned a device identifier (ID) based on the devices capabilities. The same may be true with a locator (LOC). In this way, a subset of an IPv4, IPv6, or MAC address space may be utilized for UEs of a capability or capability group. A network may employ a ID-to-LOC mapping, a LOC-to-ID(s) mapping system and a CAP-to-ID and/or CAP-to-LOC to identify a number of IDs or LOCs with which UEs exhibiting a particular capability are located. Core network nodes, base stations, UEs may all be capable of performing translation services. UEs may be located in a RAN or RANs and one or more data networks (DNs). Requests for translation may be provided by any device disclosed herein. Responses including location information may be based on a network slice location.

UEs may be capable of communicating with servers using an edge computing or multi-access edge computing (MEC) configuration. These servers may supply augmented and virtual reality images, video and other applications. Other servers may supply additional information which is provided at low latency as the servers are closer to the UE than being outside a network. A UE may report a capability to support AR, VR and HD video over an internet multimedia subsystem (IMS).

In an embodiment, a MEC configuration may encompass distributed applications running on entities which may not be trustworthy. At a minimum, at least one entity, for example, a UE may not trust a MEC Application while other UEs may have a trust policy in place. In an embodiment, a MEC application may not be collocated with data, thus forcing the MEC application to become trusted in an effort to obtain the information. A UE or MEC application may need to perform remote attestation, i.e. verify the integrity of code (or script, for example javascript or java) running remotely. Additional cryptography may be needed in the case where verified code is randomized, i.e. with a seed or other value. In an embodiment, a first UE may request that a second UE assist in verifying the integrity of an application running on a MEC application associated with or owned by the second UE. The second UE may request the MEC application perform a hash function on some code segment (either while running or prior to running), and the second UE may pass the hash to the first UE for verification. If the first UE verifies the hash, i.e. the hash matches a stored hash or a hash received from a trusted third party, for example a trust anchor, then it can be assumed that the MEC application may be trusted. In this way, by encrypting content provided between the first UE and the MEC application, the second UE may not interfere with or modify the encrypted content.

MEC application servers may be associated with satellites, blimps or other moving transmitters which may move in accordance to or with their MEC application protocols or performance. For example, various AI learning techniques may be employed here to move transmitters. As these devices move, they UEs they serve may change and those UEs may be interconnected with one or more MEC application servers. Satellites may broadcast information, via fixed or moving Earth beams, regarding their trajectory, movement, position, or the like and also they may suggest IP addresses, or other handover mechanisms for which the UE may access a new MEC application server, for example, may receive data from, such that the UE will receive data from the nearest MEC server in relation to the UE, satellite or the like. UE may request an IP address of a MEC server, from a satellite or gateway to the satellite, and may receive a response including a new IP Address or DNS information of the MEC server or group of servers, or the like. Alternatively or in combination, the UE may report satellite measurements and receive the IP address in response. Satellite measurement taking and measurement reports may be timed based on altitude of a transmitter. For example, based on an altitude, there may be less or more frequent need for measurement reporting.

Networks (including UEs, base stations and the like) may operate in various radio frequency bands. Among typical bands, including the ISM band, networks may operate in the 3.5 ghz band (between 2550 and 3700 mhz). The 3.5 ghz band may be a band with which network devices need to perform carrier sense before transmitting. Carrier sense may be performed based on radar or radar signatures in this band. Other bands include the 2.4, 5 and 6 ghz bands. STAs may exchange a capability to support simultaneous band operation and scheduling. For example, an AP may indicate via a bitmap, that data is buffered for transmission over a plurality of different bands. This determination may be based on a STAs availability to receive the data on these different bands. Some bands may be used for out-of-band type communication. Depending on band used, sub bands may be 20 mhz, 40 mhz, 80 mhz, 160 mhz, 320 mhz or 640 mhz or any combination.

In some instances, an AP or base station may configure a band or a bandwidth in accordance with one or more STAs or UEs capabilities which may be reported on a default band. In this way, the AP may save power by delaying until receipt of capabilities. An AP may operate a band in a direction only or in a plurality of directions but less than all potential directions. This may serve different capability UEs in different directions. For example, UEs of a same power capability may indicate preference to join a power capability group or may be interested in forming a group (including other interested parameters, QoS, MCS capability, etc.) based on power ability. This group preference may be broadcasted with capability information.

STAs, for example, meter type STAs may enter and resume from power save modes. Because meters communicate infrequently, it is important that only minimal bandwidth be allocated to them. Meters may be allowed to sleep until woken up. In some cases, a meter or other device may be instructed to sleep or enter a power save mode in a DCI format or other communication. The DCI may also include wake up scheduling parameters, for example, a temporal key for use upon wake up, and what to do upon wake up. A meter may or may not wake up depending on whether it has enough energy to wake up and make at least one transmission. The determination may be made based on a battery level which may be charged via light (similar to a photo-voltaic solar cell solar such as one found in a calculator; a water meter may be powered by water pressure, or the like).

A UE may also include a device under test, for example, during manufacture of the device. In this way, the UE may communicate with the tools used to build the device. UEs may be powered via wireless chargers provided by the manufacturer or a different manufacturer (having a same manufacturer ID or different manufacturer ID) and may employ data communication services via the wireless doc.

A UE may be capable of receiving sidelink or V2X type transmissions from other vehicles, relays and base stations simultaneously in a coordinated fashion. For example, a same transmission may be received from another vehicle, a relay and a BS at once. Relay transmissions may employ time or frequency diversity. For example, a frame may be transmitted on multiple bands or may be duplexed or repeated over the multiple bands. In other examples, a UE may receive data in a broadcast or multicast fashion. For example, the vehicle may receive traffic information in a broadcast format when the traffic information apples to a large geographic area and in a multicast format when the information applies to a smaller area for which the vehicle is located within. The area sizes may change depending on the level of congestion or traffic reported. If a number of vehicles are located in a given area, e.g. a threshold is met, that information may be provided to a larger area than initially reported. HARQ feedback may or may not be provided in response to the traffic information. HARQ transmissions or feedback may be transmitted concurrently with data, with control information, for example scheduled by one or both of DCI formats 5_0, 5_1, or with other HARQ transmissions or feedback, in an embodiment, over alternative channels, links or bands. STAs and UEs may be capably of ARQ or HARQ and may report the capability to networks and other STAs. Depending on a priority or amount of information being acknowledged, HARQ may operate on a PDU, MPDU basis, aggregated frame basis, codeword basis, symbol basis or the like. Frames may be aggregated in MAC Management Protocol Data Unit (MMPDUs) or other PDUs.

For notifying a UE of a multicast (or broadcast) data, a multicast RNTI may be used which corresponds to the multicast group. A DCI format may be provided on a control channel, for example, a PDCCH channel to signal resource information, via a DCI 6_0 or 6_1 control format, for the multicast messages. These DCI formats may include other information. The resource information may be periodic in nature and may specify multiple downlink shared channel (DSCH) resources over time in a periodic method.

In an embodiment, a DCI may be received from one, two or more base stations for scheduling uplink or downlink transmissions to or from those base stations or other base stations. A UE may have a capability to support simultaneous DCI reception from multiple base stations. A DCI may schedule a variable number of fields which correspond to the number of base stations indicated. For example, if there are two scheduling base stations, then the DCI may have two MCS fields, two power control fields and the like. If there MCS or power is expected to be the same for both cells, then the UE may implicitly derive the MCS, power or any other parameter herein from the notion that only one field is provided to the UE. In another embodiment, if some parameters are not changing often enough, some parameters may be provided for a first one of the base stations in a first grant and a subset of those parameters in a following grant. Thus, the parameters in the DCI may vary in presence and in length. The field may implicitly indicate a parameters of one base station as opposed to another in terms of frequency, time, or another parameter in which the UE can derive a scheduling base station from.

In an example, a Boolean field may specify whether a DCI schedules two PDSCHs over two cells or whether the DCI schedules one PDSCH over two cells.

System information provided by a base station may indicate support for 1024QAM and/or 2048QAM. The UE may determine to access the base station due to the support for either modulation format. In an example, an indication to support a modulation method may be provided based on UE position, for example, whether or not the base station is an indoor base station serving UEs inside a same location. In an embodiment, the base station may broadcast a beamforming capability. Based on a threshold for beamforming, the UE may determine that the base station supports a particular modulation format or type. An AP may beamform STAs within a local BSS or may beamform STAs within another BSS. Alternatively, an AP may transmit null messages to the STAs in the another BSS. In an embodiment, an AP may be an element of multiple BSSs. Beamforming refinement procedures may be performed, for example, using time sequenced beam forming refinement transmission and receive procedures.

A UEs position may be determined via transmission and reception of radio signals. In an embodiment, one transmitter(s) may physically collocated or may not be collocated with one or more receiver(s) of the signal. Transmitter and receivers may need to exchange a capability of detecting or transmitting position detecting, orientation detecting, presence in a room, or other detection capabilities. The object being detected may or may not also have or be coupled to a transmitter/receiver. For example, capabilities may include an ability to wake a radio component or other component upon detecting presence of an object. Other capabilities may include gesture recognition capabilities. In an embodiment, a UE may detect gestures which would typically be performed via touchscreen. For example, a tapping gesture, swiping gesture or the like may be better performed via radio control or manipulation. Gestures may be detected via audio, video or other recognition methods. Transmissions may be made in response to a detected gesture. Gestures may be classified by neural networks or other methods. In an embodiment, tapping on a surface of which a UE is on may cause the UE to perform an action.

Figure 8:
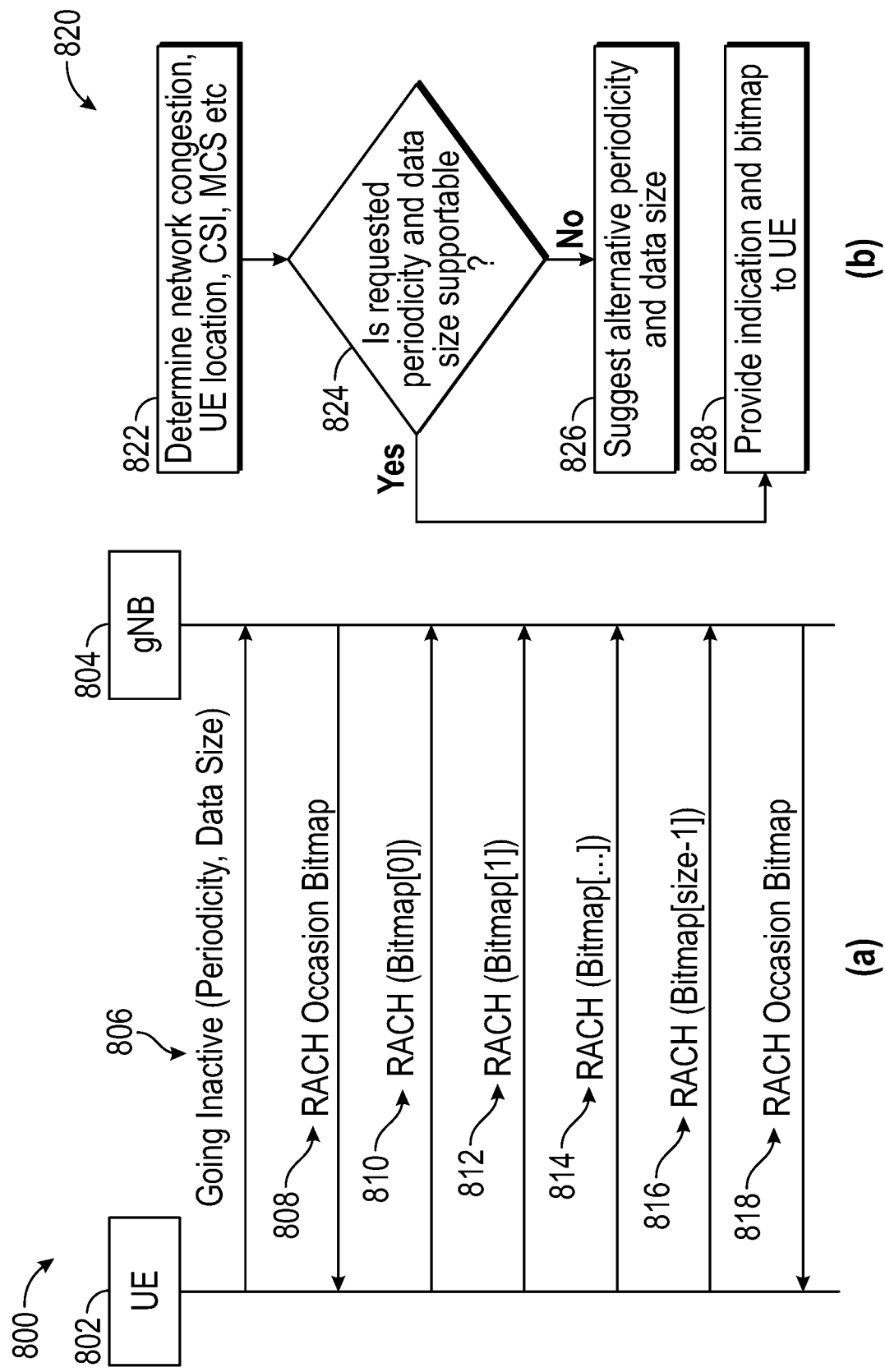
FIG. 8(a) illustrates a timing diagram for receiving a random access channel (RACH) occasion bitmap.
FIG. 8(b) is a flowchart for providing information to a user equipment (UE)

FIG. 8(a) illustrates a timing diagram for receiving a RACH occasion bitmap. A UE 802 may report 806 to a gNB 804 that it is entering inactive state. In the message, the UE may include a periodicity and data size for which the UE may report periodic small messages. In this way, the UE need not enter a connected state to transmit data. The UE may also reduce a number of transmit antennas in the INACTIVE state. In response to the suggestion to go inactive, the gNB may provide a RACH occasion bitmap 808 which indicates RACH occasions for subsequent transmission of small data. The UE may transmit at each occasion 810-816 until there are no more occasions remaining in the bitmap. At which point, the UE may renegotiate by providing a new message indicating periodicity and data size or the gNB may simply provide a new bitmap 818 given the likelihood of the UE continuing with the periodic transmissions. Periodic transmissions may be integrity protected using keys exchanged prior to the going inactive message. In another example, the RACH occasion bitmap response may comprise an encryption key or integrity protection key for the subsequent periodic message transmissions.

FIG. 8(b) is a flowchart 820 for providing information to a UE. A gNB may determine 822 whether a periodicity and data size is or can be supported 824 based on network congestion, the UE location or position, a UE mobility state (for example, PLMN mobile, handover between terrestrial and non-terrestrial), CSI, supported MCS, etc. If the request is supportable, the gNB may provide 828 an indication of such and a bitmap in a same or different message. If not, the gNB may suggest 826 a periodicity and data size which can be supported by the gNB and network.

Congestion may be analyzed based on throughput, packet delay, sending rate, buffer status or the like. UEs and STAs may coordinate congestion protocols and parameters, using sidelink or other technologies, so as to reach a network throughput maximum in a fair manner. For example, STAs may negotiate congestion window parameters, may provide an indication of received acknowledgements over a time interval or alternatively, these parameters may be coordinated by an AP or TRP. STAs may provide a priority indication of buffered traffic so as to adjust congestion parameters.

Congestion parameters may be correlated to priority, for example, a congestion window may be used per priority and/or per one or more link(s) of a STA. A single bit or multi-bit indicator may be employed in a PDU or frame to indicate whether or not transmission/reception points, routers (including switches, other nodes, and forwarding devices), ad hoc STAs or other devices should adjust congestion windows. For example, a single bit indicator provided in a frame may indicate to a recipient whether or not the sender is increasing or decreasing the congestion window and thus the recipient should expect another packet immediately following. With a multi-bit indicator, the window may be adjusted so as to either receive a plurality of frames immediately following or to delay transmission for a given period. The period may be calculated based on the value of the multi-bit indicator. For example, based on the MCS, number of links, link quality, etc. STAs which receive the frame including the multi-bit indicator may determine a number of frames which may follow. In an embodiment, if a multi-bit indicator indicates that no frame will immediately follow the frame which includes the multi-bit indicator, $3^{rd}$ party receiving STAs may determine that the medium will be available shortly and for some duration. If the multi-bit indicator indicates that the congestion window shall open up, then a $3^{rd}$ party receiving STA may determine that a transmission opportunity on one or more link(s) will not be available for a duration. The $3^{rd}$ party STA may send an RTS on another link, another channel, for example, using another one or more beams or the like. A receiver of the single bit or multi bit indicator may sum the indicators to determine a window size adjustment. Packets may be marked with an indicator in a preamble, midable or data (for example payload) portion.

In Wi-Fi 7 (802.11be), a universal signal field is proposed. The u-sig comprises a release version independent portion followed by a release version dependent portion. The independent portion conveys information which all receivers should interpret, while the dependent portion conveys information according to the release. Because this u-sig field is designed to support encoding information for future releases, there may be additional padded information at the beginning, middle or end of each field. A U-SIG field or other SIG field may comprise any field or data structure or type disclosed herein.

FIG. 9 demonstrates that a portion of each U-SIG field transmitting in a plurality of frames may be buffered to form a larger data block. FIG. 9 shows two U-SIG fields 900, 902 received sequentially. A receiver may save bits of a potential padded region 904, 906 of U-SIG 900 and portions 908, 910 of U-SIG 902 to form a data block 912. Additional U-SIG portions may be appended onto data block 912 to form a larger data block.

Broadcast announcements may be used for indicating desired capabilities of coordinator (i.e. transmitter of the broadcast announcement) and desired capabilities of other APs/STAs to form a multiple access point candidate set. The multiple access point candidate set may also include APs of varying protocol/release versions. For example, the announcement may comprise a release indicator indicating a release indicator of X, below X and/or above X. In this way, release indicator may specify at least some minimum capability to join the candidate set.

Alternatively or in combination, unicast requests may be sent. The unicast requests may be sent in various directions and/or on different frequencies and time instances. The unicast requests may also comprise release indicator and desired capabilities.

Each transmission may indicate resources, for example, time/frequency resources for a response transmission. These resources may be scheduled/coordinated ahead of time via negotiation. Requests may also request specifically simultaneous transmit receive APs respond or that non-simultaneous transmit receive APs join the group.

An AP which transmits a frame to another AP, STA or group thereof may not necessarily be a coordinator AP who formed the group. Rather any AP or STA within the group may initiate a transmission among the group. When forming a group of APs for multi-AP data delivery to STAs (or other APs), a coordinating AP may define a number of potential APs with which to form the group. For example, if the coordinator requires 2 APs, and prefers capabilities above Y (among X, Y and Z capabilities), the coordinator may indicate capability and number of APs in a broadcast message. Assuming there are 2 Y capable APs in range of the broadcast message, both may respond on same resources. However if there is 1 Y capable device and 1 X capable device, the 1 Y device may respond on a first in time resource, while the 1 X device responds at a later time instant. In this way, The X device may determine that less than 2 capable devices responded and thus should also indicate availability. However, if the X capable device hears that 2 Y capable devices have responded, there is no need for the X capable device to respond. This may be enabled due to each device understanding the U-SIG field indicating release version.

A release version may indicate a maximum capability supported by an AP. In this way, for example, if a STA is associated with two APs, and receives frames from both APs, the STA may respond to both APs with a frame indicative of a minimum of the two release versions. This way both APs may successfully receive a frame transmitted to both APs.

A STA may request APs of a given capability form a group. The STA may broadcast a message indicating BSSID, link parameters of the AP, QoS requirements, STA capability, group capability etc. The request may be looking for an already formed group of APs, or to indicate to the APs that they will need to form a group.

FIG. 10 illustrates a flowchart for group transmission. In an embodiment, a STA or AP may perform sensing 1002 to decode release version identifiers of PPDU preambles. Information corresponding to the release version identifiers, MAC addresses, receive power information and directions of PPDUs may be determined 1004. Whether to initiate 1006 group formation based on stored information may be determined. Broadcast group formation information may be determined 1008 based on the stored information. A lead STA may be negotiated 1010 based on CSI computation performed with an AP or other STA. If a devices is determined to be a lead 1012, buffer status information may be collected 1014 from the group. A joint BSR may be transmitted 1016 and a trigger received 1018. Group data may be sent 1020 in parallel with group members.

STAs and APs may perform sensing to discover nearby devices. In an embodiment, sensing may comprise decode release version identifiers of single user or multi user PDU preambles. Tables may be used to store information corresponding to the release version identifiers, MAC addresses, receive power information and directions of received PDUs. Also, neighbor reports may be used to correlate information and ascertain information about devices. Sensing may be performed over a time period signaled by another device, for example, an AP device. Sensing may be based on a parameter reaching a threshold, for example, any parameter disclosed herein. The threshold may be standardized or may be signaled by another device. The threshold may vary based on one or more other parameters.

Devices may determine whether to initiate group formation based on the stored information. For example, if discovering that a threshold number of devices are within range and have a minimum release version or other capability, a group may be formed. Otherwise, group formation may not be worthwhile. An AP may specify a message indicating a device capability and parameter(s) useful for determining group formation. For example, parameters may include signal strength parameters, capability, device type, device movement and/or position among others. In an embodiment, the AP may be an Unmanned Aerial Vehicle (UAV) which groups the devices into 3 dimensional clusters (or two dimensional clusters) for joint transmission to the group and joint reception from the devices of the group. UAVs may implement a wireless backhaul and may negotiate power control parameters and other transmission parameters. Groups of ground units may be formed based on interference, for example, mobile devices which experience a high degree of interferences may or may not be grouped together.

STAs which are preliminary determined to participate in a group may begin receiving broadcast or unicast group formation messages from other STAs. Based on a capability and/or desire to do so, device may transmit broadcast group formation messages. In an embodiment, group formation messages may be transmitted using incremental power so as to incrementally form a group of a given size/distance.

STAs may perform CSI and sounding protocols either individually or jointly with an AP, if the AP is within range, to determine a candidate for leading the group. Alternatively, there may be no lead group member and each group member may be on equal footing.

If there is a lead group member to be determine, the STAs may negotiate the lead STA based on CSI computation performed with AP. The AP may perform a sounding procedure by transmitting sounding information, for example, a sounding schedule, NDP or the like. STAs may respond sequentially or at the same time to the AP. Alternatively, STAs may share their CSI computation among the group, and the group member with a best channel state may report the CSI for the group members.

The group may transmit a joint BSR to AP. A trigger frame may be received in response to the BSR. Data transmissions/receptions may be performed simultaneously on same frequency/time resources by implementing group based successive interference cancellation. For STAs which have determined to not form a group of STAs, these STAs may perform SIC and may simultaneously transmit, while group members themselves are non-STR compliant when a member of the group. Simultaneous transmissions may be multi-AP transmissions, for example, multiple distinct APs, or multiple APs within a same and/or other AP.

In an embodiment, instead of padding transmission portions, a transmitter may encode brief information which may not change frequently. The receiver may maintain a buffer, for example, a circular buffer or other buffer, which stores the additional information to form a larger group of data bits which represent higher layer information or other information. The information may be used to determine any parameter or data type herein. For example, the information may indicate feedback information (how well a transmitter, beam, modulation, etc is operating) or other suggestions to the receiver. In an embodiment, instead of forming a buffer, a receiver may perform a logical operation, for example, an AND, OR, XOR on one two or more portions of each received frame to obtain additional information. A look up table may be employed as well.

An indicator of beam support may be provided by a UE or gNB. For example, a UE may support corresponding beams or non-corresponding beams, for example without having to perform sweeping. The indicator may specify one or more of: MU-MIMO; multi-TRP; multi-panel; N4: UL MIMO/coverage; or beam management mode. A UE may support panel switching in accordance with panels of the UE or a TRP.

UE capability may indicate that not all beams may be usable. In one embodiment, a UE may compute effective (or equivalent) isotropic radiated power (EIRP) or a delta or change thereof. A UE may transmit an identifier which indicates a multi-panel configuration. Sweeping procedures may be performed on multiple TRPs, multiple cells, multiple layers and the like, for example transmit sector sweeps and receive sector sweeps. In one embodiment, a number of beams used may increase on an increasing scale. For example, x beams may be used for a 450 mhz to 6 ghz band, 2x beams used between 6 ghz and 24 ghz, 3x beams used between 24 ghz and 52.6 ghz, 4x beams used between 52.6 ghz and 114.25 ghz, 5x beams used between 114.25 ghz and 275 ghz. Higher frequency bands, for example, 52.6-114.25 ghz and above may be used for sidelink communication while other bands are infrastructure based. A multi-panel configured UE may activate panels upon movement of the UE, for example, via an accelerometer, via measurement taking or via network signaling.

A DCI may indicate multiple-TRP information in a multi-panel or multiple TRP use case. For example, the DCI may indicate a number of layers transmitted per panel and may also indicate a panel ID. Panel information including ID and the like can alternatively be signaled in RRC signaling.

A UE or gNB may detect a beam failure and a recovery procedure may be necessary. In one embodiment, beam recovery may be initiated by a timer. The same may be true for radio link failure. This would allow the UE to utilize a contention free period in which the UE may recover a beam. The UE may attempt to use preconfigured RACH resources to recover a beam. The subset of resources available for beam recovery may be greater than or less than the resources initially provided for initial or random access. In one embodiment, the beam recovery timer may be incremented upon successive failure attempts. In yet another beam recovery embodiment, upon beam failure, a UE may utilize a secondary cell or another cell, for example a WLAN cell, to signal to a PCell a request for resource(s) to perform a beam recovery procedure. The failed cell/beam may be indicated or conveyed to the base station. The resources may be signaled through the WLAN or other cell. During a beam failure, a UE may determine that it may need to perform random access to acquire a new timing advance and resource grant. The UE may then transmit on the resource grant. The UE may use the RACH to transmit information as to the cell (PCell, SCell) and an index or bitmap corresponding to the failed beams. The UE may also use higher layer signaling if possible, for example MAC signaling.

A UE and base station may negotiate a number of monitored PDCCH candidates and number of non-overlapped CCEs per slot/serving cell. This may limit the number of blind decodes. In an embodiment, a UE may provide the base station with capability information for the base station to configure the UE with candidate information. For example, a UE may provide the base station a requested number of monitored PDCCH candidates and number of non-overlapped CCEs per slot/serving cell. A base station may respond with a response and indicating an established number. The response may indicate a delay period for which the UE must delay before transmitting another request. In an embodiment, the response may be final, for example, not able to be renegotiated until after an event occurs. In an embodiment, a request may be provided by the base station and a response may be made by the UE. The response may be derived based on capability of the UE. The request/response pair may negotiate other aspects, for example, location of PDCCH monitoring occasions, minimum or maximum DCI format sizes or types and/or specific DCI formats for which the UE wishes to receive or avoid. A binary indicator may signal a set or subsets of DCI formats.

In an embodiment, a UE may be provided with an index into a table or bitmap which indicates a resource for use in a time or frequency manner. The same table or bitmap may indicate a MCS or beam (via the index specified via DCI). The table or bitmap (indicating symbols, slots, transport blocks or the like) may be scheduled in advance via MAC, RRC etc or may be included in a DCI. In one embodiment, the table may be via a SIB. A DCI may indicate implicitly, as an offset of the DCI itself or any parameter included within, another scheduling parameter, be that time/frequency/resource/beam or the like. For example, RRC may schedule groups of resources which can or cannot be used for URLLC and a DCI may indicate one or more of the groups.

Scheduling transmissions or notification transmissions, for example, transmissions that notify spatial use or future spatial occupancy. A sync frame may be transmitted by a transmitter, for example, STA, AP, base station or the like that notifies spatial use, for example, notifies transmission direction, power, transmitter, receiver, transmission type or the like. The notification frame may be a notification indicative of a transmission of two other devices. For example, an AP may schedule one or more transmissions of two STAs which are in a same BSS or an AP may schedule transmissions for STAs which are not in a same BSS. In an example, an AP may schedule a coordinated transmission, for example, a transmission from one device to a plurality of other devices. Alternatively a transmission may be scheduled from a plurality of devices to a single AP or other device. In this way, spatial use may be optimized. The scheduling transmission may be a broadcast transmission with a broadcast identifier. The scheduling transmission may be transmitted using a beam predetermined based on a location of known or unknown STAs. There may be a duration indicated in the scheduling transmission to inform STAs of a transmission duration. A scheduling transmission may schedule a period of time for acknowledgement transmission. The scheduling transmission may also include trigger information, for example, transmission time/frequency/space information, which indicates resources for data or ack transmission. The scheduling transmission may indicate time/space/frequency information for ACKs, or block ACKs or multi-sta block acks which are on different time/frequency/space resources. These different time/frequency/space resources for data or ACK transmissions may need to be estimated based on a STA or other device movement. Thus, an AP may transmit the scheduling frame, hear the data frame that follows and then send an updated scheduling frame or short scheduling frame so as to update other STAs of the next ACK frame that may follow. An initial scheduling frame may include counter that changes each time a scheduling frame is transmitted. This way, a receiving STA which is mobile may not receive each scheduling frame, but may maintain a table or database over time indicative of where other STAs are located, prior MCS values, etc and may update this table accordingly. The counter may wrap around once a predetermined value is exceeded. The counter may be used to update the different channel state or channel quality values received by scheduling transmissions. Scheduling transmissions may be appended to beacon or other frames transmitted by an AP.

A MIMO compliant UE might use multiple beams to search for the TRP, each beam tailored to a slightly different frequency. A best case could be an ideal frequency all the way up to a threshold for a worse Doppler shift quantity. In this way, regardless of the Doppler shift, a UE may detect a TRP transmission in one (or more) time periods. Alternatively, Doppler shift may be determined based on information received from another cell (or based on a transmission of another cell).

Synchronization signals may include a primary synchronization signal and a secondary synchronization signal. These signals may be transmitted at different times and may indicate different portions of a variable length identifier of a base station, gNB, TRP etc. They may also be transmitted with different power levels from each other or from other signals. For example, the PSS or SSS may be transmitted at a different power level than the PBCH. It may be that the PSS, SSS and/or PBCH are each beamformed and/or transmitted in a sweeping manner. Other signals may also be swept either in uplink or downlink. The UE may receive the PSS, SSS and/or PBCH on a plurality of beams and determine which beam is strongest. PBCH may carry a master information block and/or secondary information block, i.e. a system information block (SIB). PBCH may be transmitted at a lower power level than SS (or vice versa). A plurality of PBCHs (or PDSCHs, PDCCHs, PUSCHs, PUCCHs) may be transmitted by a gNB (or a UE) which may overlap in time, frequency or beam. In one embodiment, a gNB may or may not vary a DMRS sequence index for each transmission.

Network topologies may include coordinated transmission topologies or joint transmission topologies. Transmissions/receptions may be made simultaneously by a plurality of APs, a plurality of STAs, a plurality of UEs, a plurality of gNBs or base stations or the like, for example, if an RSRP of transmissions from the group of transmitters is greater than transmissions from one or the other. Availability and scheduling for simultaneous transmission, overlapping transmissions or individual transmissions may be coordinated by a controller which operates on a publish/subscribe model via pub/sub messages. Controller may relay information on any information element described herein. Parameters may be provided and requested alternatively or in combination. Each AP may subscribe and thus receive information for use. Some APs of the set may be configured to operate on a 320 mhz bandwith while other APs may be configured to operate on a 160 mhz band. Channels may be aggregated to reach these bandwidths. Transmissions may be coordinated by sending NDPs by an AP or STA to another BSS and receiving sounding responses. If a response is positive, i.e. above a threshold, the AP or STA who sent the NDP may not send transmissions in that direction (using the same beam) in future transmissions to the BSS of which the AP or STA is a member. This information, including the location, selected beam, transmission time and feedback quantity/type/results may be shared among APs and among STAs. A responder of the NDP may broadcast the feedback to multiple BSSs when the NDP indicates to do so.

Determining whether BSSs or TRPs overlap with one another may be based on an overlapping basic service set threshold or overlapping transmission reception point threshold for a UE and STA, base station or the like. The threshold may be set based on traffic load or average priority of data transmitted in the other BSS (OBSS) or the determining BSS. For example, an overlap may threshold may be lower if there are fewer devices than a threshold in the BSS. The threshold may be set based on station location in the OSS. Thresholds may be determined via broadcast messaging transmitted by the OSS and relayed or initiated by STAs of the OBSS. An overlapping threshold may be based on multiple thresholds determined via multiple devices. A starting count down counter from maximum distance/maximum power to lower distance/lower power may be used. Transmissions may be avoided based on threshold counter or threshold.

gNBs may be logically and physically separated into a distributed unit (DU), i.e. the radio portion and a Centralized Unit (CU) which may be separately located. The CU may be virtualized and may in instantiated upon necessary. A cable modem may be used for front haul. A cable modem may interface with a DU or CU or both. Either the DU or CU may implement or perform: PHY, MAC, RLC, PDCP or RRC layer processing depending on a processing split type.

When UEs on a train enter a new cell, the UEs need to perform handover at a same time on a same cell. This may limit performance. In one embodiment, a train may signal to each UE of the train, random access parameters for example, a preamble such that each UE has a unique preamble or subset of preambles to use for random access. In this way, a ground based base station is not bombarded by handover devices. The train may signal the preambles or subset thereof via a mounted transmission/reception point which has circuitry dedicated for this purpose. The signaling may be cellular signaling or wireless local area network signaling. The signaling may be on frequencies dedicated for train communication and thus may only be used by the UEs in this scenario.

Train safety measures may include red light signal RF transmission, via directional RF transmission and via broadcast for other trains; dual rf and track based transmission; conductivity checking over a track segment ahead, for example, a bridged section; ensuring that brakes are applied to a correct train; confirmation of brake application/engagement and RF reception of said confirmation of brake engagement; per wheel/per train car derailment detection and broadcast notification, for example, in a 5.9 GHz band; train segment attachment detachment determination; remote display of all trains and train cars engaged/connected to network; radio signaling of hazardous materials, for example, explosive materials; a data recorder may be configured to intercept, record, and may provide PHY, MAC or higher layer signaling to train, from train, or the like; and data transmission of door open events, door close events, train departure events, and train arrival events. The 5.9 GHz band may be applicable for any train type communication.

Train communication overload may occur when multiple trains pass through a radio cell termination, for example, at a point of handover. Each train may have it's own RF transceivers plus the train may be carrying many passengers. Thus, it may be preferable to prioritize transmissions, such as control transmissions, data transmission, RACH transmissions of the train equipment over user equipment. The opposite may also be true, for example, for high priority UE transmissions such as emergency event transmissions of UEs. A UE may be configured to not transmit data when the UE is known to be on a train which needs to perform RACH. The train may broadcast delay information to UEs for RACH. The UE may receive a RACH transmission pool or a limited RACH transmission schedule via sib or via the train. UEs/STAs may also receive pools for coordination and broadcast resource scheduling.

Trains may be configured to share RF and act as relays for UEs. This may occur via satellite or other means. Trains may be configured to slow down in hazardous areas which may be more risky than other areas. Trains may employ derailment sensors for determining whether brakes need to be applied or if the train should be slowed. Wind sensors, snow/ice sensors, and other sensors may be employed. Power loss events, for example, power loss events from a main battery system or other power sources may cause train operation to change, for example, to slow. Notifications may be transmitted to UEs and/or to ground based receivers. A TRP, for example, a base station may provide a neighbor report which indicates neighbor TRPs that are generally accessible by other UEs in range of the reporting TRP. For example, a TRP may be as shown in the table below.

TABLE 1

|  | Neighbor A | Neighbor B | Neighbor C | Neighbor D | Neighbor E | Neighbor F | Neighbor G | Neighbor H |
| --- | --- | --- | --- | --- | --- | --- | --- | --- |
| Type | UAV | satellite | terrestrial | Blimp | Satellite | Terrestrial WLAN | Indoor AP | Airplane |
| Distance (relative position) | 30 meters | 1125 meters | 400 meters | 1300 meters | 4 km | 800 meters | 45 meters | 13 km |
| Altitude | 7k meters | 35,000k meters | 400 meters | 17k meters | 24,000k meters | 10 meters | 3 meters | 10k meters |
| QoS supported | Voice | Video | 8k video | Low priority only | 4k video | Voice | Medium priority + low priority | SMS only |
| Multi-band support | X Channels supported | Y Bands supported | No additional bands supported | Same as neighbor A | A bands unsupported | B Channels unsupported | . . . | . . . |
| Admission Control type | Failover only | No admit control | Band based | User based | QoS based | Power based | Protocol based | Latency based |
| Number of supported data channels | No supported data channels other than primary channel | 2 | 4 | 8 | No supported data channels other than primary channel | 1 | 5 | 9 |
| Bitmap <Number of links, Link quality, load> | 2, high, max capacity | 4, med, underloaded | 8, low, max capacity | 4, med, available | 2, med, max capacity | 1, high, empty | 2, med, empty | 2, low, max capacity |
| Awake? | Not awake | Awake | Awake | Not awake | Awake | Awake | Not awake | unknown |

In the table above, QoS support may be based on a QoS support tagging level. The level may relate to a number of QoS levels or number of bits applied, or the like. Additional parameters may include a timing advance (course, medium, fine) for each neighbor relative to the transmitting TRP; a congestion level, a multiplier for TA, a number of bits needed for a TA, Doppler shift, supported PRACH formats, traveling speed or the like. TRPs may broadcast or transmit system information of another TRP using broadcast SIBs or on demand SIBs. Satellite coverage areas may be denoted, for example, using satellite identifiers, using synchronization signals or by using other methods to denote identifier(s).

When a gNB transmit SIBs in release 15, the SIBs are only applicable for a certain cell within a given area. This means that multiple gNBs are transmitting potentially same information in the same area. In an embodiment, a SIB1 message may indicate scheduling information for other gNBs in the area. The scheduling information may allow UEs to receive other SIBs of the other gNBs without having to obtain a SIB1 from the other gNBs. A SIB1 message may be modified as:

```
                                 SIB1 message

-- ASN1START
-- TAG-SIB1-START
SIB1 ::= SEQUENCE {
    cellSelectionInfo                SEQUENCE {
        q-RxLevMin                       Q-RxLevMin,
        q-RxLevMinOffset                 INTEGER (1..8) OPTIONAL, -- Need S
        q-RxLevMinSUL                    Q-RxLevMin OPTIONAL, -- Need R
        q-QualMin                        Q-QualMin OPTIONAL, -- Need S
        q-QualMinOffset                  INTEGER (1..8) OPTIONAL -- Need S
    }                                OPTIONAL, -- Cond Standalone
    cellAccessRelatedInfo            CellAccessRelatedInfo,
    connEstFailureControl            ConnEstFailureControl OPTIONAL, -- Need R
    si-SchedulingInfoPrimary         SI-SchedulingInfo      OPTIONAL, -- Need R
    si-SchedulingInfoSecondaryA      SI-SchedulingInfo      OPTIONAL, -- Need R
    si-SchedulingInfoSecondaryB      SI-SchedulingInfo      OPTIONAL, -- Need R
    si-SchedulingInfoSecondaryC      SI-SchedulingInfo      OPTIONAL, -- Need R
    servingCellConfigCommon                     ServingCellConfigCommonSIB OPTIONAL,
                                        -- Need R
    ims-EmergencySupport             ENUMERATED {true} OPTIONAL, -- Need R
    eCallOverIMS-Support             ENUMERATED {true}OPTIONAL,-- Cond Absent
    AugRealOverIMS-Support           ENUMERATED {true}OPTIONAL,-- Cond Absent
    VirRealOverIMS-Support           ENUMERATED {true}OPTIONAL,-- Cond Absent
    HDvideoOverIMS-Support           ENUMERATED {true}OPTIONAL,-- Cond Absent
    ue-TimersAndConstants            UE-TimersAndConstants OPTIONAL,-- Need R
    uac-BarringInfo                  SEQUENCE {
        uac-BarringForCommon             UAC-BarringPerCatList OPTIONAL,
                                            -- Need S
        uac-BarringPerPLMN-List             UAC-BarringPerPLMN-List OPTIONAL,
                                            -- Need S
        uac-BarringInfoSetList           UAC-BarringInfoSetList,
        uac-AccessCategory1-SelectionAssistanceInfo CHOICE {
            plmnCommon                   UAC-AccessCategory1-
                                         SelectionAssistanceInfo,
            individualPLMNList           SEQUENCE (SIZE (2..maxPLMN)) OF
                    UAC-AccessCategory1-SelectionAssistanceInfo
        }                                OPTIONAL -- Need S
    }                                OPTIONAL,-- Need R
    useFullResumeID                  ENUMERATED {true} OPTIONAL, -- Need N
    lateNonCriticalExtension         OCTET STRING          OPTIONAL,
```

-continued

| SIB1 message |
|---|
|     nonCriticalExtension               SEQUENCE{ }      OPTIONAL<br>}<br>    UAC-AccessCategory1-SelectionAssistanceInfo ::= ENUMERATED {a, b, c}<br>  -- TAG-SIB1-STOP<br>  -- ASN1STOP |

In this way, scheduling information may be provided for SI of other gNBs, for example, secondary A, secondary B, and secondary C gNBs. When a gNB updates SI, it may provide SI information to the gNBs within the area over the wireless link or over a wired backhaul interface. In some cases backhaul messages may be time synchronized and/or time critical. The gNBs may negotiate via messaging which SIBs of all SIBs to periodically broadcast by which gNB. For example, if there are 9 SIBs to be broadcast within an area including three gNBs, an order might be as follows:

TABLE 2

| gNB1: SIB1, SIB2, SIB3 | gNB1: SIB4, SIB5, SIB6 | gNB1: SIB7, SIB8, SIB9 |
|---|---|---|
| gNB2: SIB4, SIB5, SIB6 | gNB2: SIB7, SIB8, SIB9 | gNB2: SIB1, SIB2, SIB3 |
| gNB3: SIB7, SIB8, SIB9 | gNB3: SIB1, SIB2, SIB3 | gNB3: SIB4, SIB5, SIB6 |

In this way, SIBs are iterated such that over three different time intervals all 9 sibs are transmitted by all three gNBs, however, no gNB transmits all SIBS in a single time window or interval. If the UE is interested in additional SIBs, for example, SIBs that are not broadcasted by a gNB, the gNB may request those SIBs using a bitmap, array or other means when the UE is in INACTIVE, CONNECTED mode or in another mode. The UE may use a random access procedure to request the additional SIBs or MAC or RRC signaling may be used instead. SIBs may provide information for selecting, by a UE, transmit beam parameters for single or multiple panel operation by one or more of the plurality of gNBs within an area.

Header formats may be used to distinguish different versions of 802.11 transceivers, for example, EHT, VHT, HT etc. For example, in order to differentiate a frame from an 11ax frame, the frame may have a header comprising an RL-sig field which is not a direct (i.e. verbatim) repeat of an L-sig field. For example, an RL-sig may be computed as: L-sig XOR L-sig, L-sig logical or '1' sting, L-sig xor '0' string, L-sig xor STA ID, L-sig XOR group ID; L-sig XOR format specific to an 802.11 release. XOR may be replaced with a sum, subtraction, multiplicator, division of the above mentioned fields. A fixed number of bits may be simply flipped, for example, flipping of first bit in L-sig. Header format may implicitly or explicitly indicate bandwidth, number of users, number of spatial streams, harq parameters (whether or not HARQ is supported), whether or not HARQ is supported by all relays, etc. Headers may span multiple channels, for example, 10, 20, 40, 80 mhz channels etc in which one or more fields are duplicated or spread in frequency. Fields may comprise same or different information over the channel(s). Fields may be modulated according to and MCS disclosed herein. STAs or other devices may switch channels based on capability, support or channel occupancy of other STAs. Any field, message, data structure or parameter disclosed herein may be either a fixed or variable format or length. A Boolean value may specify whether fixed or variable. If variable, a number of fields or a length field may be included to signal the length or size of a message or other field in a message of one or more layers of a network stack. Elements in a message may be variable in size, for example, with an indicator used to note a length, duration or number of bits. Subelements within variable size elements may be fixed or variable.

Mesh or other frames may preferably employ encrypted header formats. In 802.11-2016, header formats are not necessarily encrypted.

FIG. 11 illustrates a frame 1100 having a encrypted address fields address 1 to address 4 1102-1108 in a MAC header 1110. A payload portion 1112 may be encrypted.

Initially, unencrypted MAC headers may be used with frames that seek to establish a security agreement, for example, one in which a shared key agreement is employed. Frames may be duplicated, for example, in time or in frequency (different frequencies or bands). Subsequently, each address of a MAC header may be transmitted over the air such that the address is XORed with a key derived from the private key. In this way, not only is the frame body encrypted (using prior art means), but the addressed may also be hidden from potential observers. The same may be true for the FCS sequence; this may be XORed with the key derived from the secret key. In an embodiment, a duration field would not be encrypted, thus STAs which receive the frame may set their NAV accordingly.

NAV setting may occur on a channel by channel basis. For example, a wireless device may broadcast NAV setting information on multiple channels, of multiple links. For example, NAV setting information may be transmitted on a primary channel of each link. NAV setting information may be omitted, however, on another link when the NAV information becomes stale.

FIG. 12 illustrates a plurality of NAV setting examples. In an example 1200 a CTS 1206 is transmitted to indicate a NAV setting operation of link 1 1202, via a duration field in the CTS 1206. The AP shares 1208 the NAV setting information of link 1 1202 on link 2 1204. This may cause a sharing delay. Because the NAV setting transmission of link 1 exceeds the sharing delay, there is remaining NAV 1210.

In another example 1230, a CTS 1236 may be transmitted and if the NAV setting of link 1 1232 is made longer than the sharing delay of a message 1238 transmitted on link 2 1234, there may be no sharing delay concern, however, there may still be a need to share the NAV setting information of link 1.

At another example 1260, the sharing delay may be shortened by modifying the header of a PDU that follows 1268 on link 2 1264. In this way, the sharing delay is reduced as the PDU only becomes somewhat longer to accommodate for additional header duration information of the link 1 1262 NAV. This header information could be read, and a NAV set, all while subsequently processing the PDU 1268 being received on link 2 1264. The header of the PDU 1268 on link 2 1264 may include a variable length field or variable number of duration fields, each corresponding to a duration of a particular link. The number of duration fields may correspond to a number of links the STA is configured to monitor.

If a wireless bridge, hub or repeater is employed, the bridge, hub or repeater may or may not need to know the secret key. The frame may also be transmitted in accordance with the secret key, for example, on frequencies and/or at times which are based on the secret key or a derivation thereof.

The secret key may be provided or derived via 3gpp type access from a cellular core network. In this way, the UE may maintain multi-access PDU session(s) with the 3gpp access network and a WLAN network such that it's MAC address remains hidden and/or MAC addresses of the WLAN APs and routing elements remain hidden. Traffic steering on the WLAN may be available when the addresses are configured to be hidden.

Some APs, STAs and relay nodes may be inherently trusted or may be verified with or without the use of a 3rd party signature. Signature pairing may be based on one or more MAC address of an AP, STA or relay node. For example a signature may be based on a plurality of MAC addresses of an AP, STA or relay node. Signatures may be based on association ID. STAs, APs and relay nodes may each authenticate a content source, for example, in a multimedia broadcast or multicast system. The path to a recipient from a destination may be verified, encrypted or signed. A data unit may include fields which may be signed or encrypted by APs, STAs and/or relay nodes. AP, STA or relay node may have a public/private key pair associated with it's MAC address or AID. In an embodiment, for example, some frames may be used for source verification, while other frames are forwarded based on the source verified frames. Verified frames may be periodic or aperiodic with data frames interspersed between. Verified frames may occupy a larger or smaller frequency band than the data frames.

In some embodiments, symmetric keys may be created and exchanged between each node, for example, before a message is passed or the keys may be included with each message data, for example, a data unit. In some embodiments, a source and destination may or may not know the path to each other and thus a path may be determined by relating broadcast or other message types. In response, once the destination receives the broadcast, the destination may response using a path developed and received via the broadcast forwarded messages. The destination may respond to the source and provide a public key or other key. Each broadcast message may be a discovery type message which carries information useful for determining a shortest path routing. For example, each broadcast may include a timestamp, number of prior relaying nodes, RSSI or the like.

Each relay node may uses public and/or private keys used to generate a symmetric key. A source and destination may exchange signatures based on their association ID, MAC address(es), and the known or unknown relay nodes inbetween, for example, discovered via path selection or discovery messages.

When routing information is forwarded to a relay node, the relay node may generate a symmetric key for the source and destination based on a hash of the public keys of each and a local secret of the relay node. In this way, each node may be identified upon receiving the message. The relay node may generates an encryption key and a signature. The relay node may append the encryption key and/or signature to the data unit which may then be broadcast or forwarded to a next relay or to destination. When each relay node appends an encryption key and/or signature to a data unit, the relay node may increment (or decrement) a counter of the data unit such that a subsequent receiver may know how many keys are embedded in the data unit. Each data unit may include unencrypted public keys of the sender and recipient in each transmission from sender to recipient. Public keys of the relay nodes may also be included. Other options include sequence numbers, timestamps, IP addresses or the like.

Ranging parameters and ranging types may be supported by a number of antennas available to dedicate to ranging and/or a UEs software ranging algorithms. In embodiments, mobile devices and transmitters may perform absolute time-of-arrival (TOA), time-different-of-arrival (TDOA), time-of-flight (TOF), angle-of-arrival (AOA), and received signal strength indicator (RSSI) based ranging procedures. Devices disclosed herein may use each one of these methods alone or in combination (hybrid approach) to determine a range, position or location. A positioning reference signal may be transmitted by UAVs, BSs, UEs etc. Device(s) may collect ranging parameters and pass some or all of the parameters to a MEC device for processing. For example, a device may receive RSSI and one or more AOA measurements from one device and receive RSSI measurements only from other devices. This may lower the complexity of the required other devices to form a location. Alternatively, or in combination, one of TOA, TDOA, TOF, AOA and RSSI may be used to estimate range from one device having capabilities to do so, while another method is used repeatedly to estimate range from another device having acceptable capabilities. Capability information may be determined via beacon messages or via request/response. Devices may or may not need to be associated to perform ranging. For example, devices may use super resolution, interference cancellation based on capability. In an embodiment, super resolution and interference cancellation may be alternated to perfect range. A UE may negotiate a number of number of slots per positioning estimate, which may vary based on UE power level, UE capability or the like. A number of sites used for positioning may depend on an accuracy level of one or more positioning measurements taken from one or more sites. For example, the number of sites may increase as the accuracy drops.

In an embodiment, a UE may not participate in ranging or positioning when a bandwidth is below a certain threshold. If positioning is required of the UE, the UE may switch to a larger bandwidth. Thus, when positioning is desired, the UE may active one or more cells and/or switch to cells of higher bandwidths. When vertical only positioning is required, the UE may perform positioning in the smaller bandwidth, but if vertical and horizontal positioning is required, the larger bandwidth may be required.

A UE or STA may signal a request for a UE having an antenna placement or configuration and may receive the requested configuration arrangement in response. The request/response may occur before or after association. This information may be used for ranging and triangulation and it may be in accordance with a capability of one or both of the STAs. For example, in the request for antenna placement, a STA may indicate a capability to perform secure ranging. For example, a capability to support a cryptographic routine (key generation, key passing, cryptographic keying of data, confirmation of such, or the like). Capability information may include the responding STA capable of selecting a format for indicating the antenna placement. In an embodiment, a Reduced Neighbor Report element may indicate triangulation information or length information for use in ranging. For example, the neighbor report may include angle of departure, angle of arrival, timing, distance, phase change information or the like. The neighbor report may indicate whether an AP or STA supports Semi Orthogonal Multiple Access (SOMA). A STA capability may include NOMA, SOMA or legacy FDMA type capabilities. An AP or STA may decide based on a signal to noise ration as to whether to implement NOMA, SOMA or legacy FDMA. APs may be configured to participate in a joint transmission, coordinated transmission for example coordinated multiple access or OFDMA etc.

An AP may determine whether to enable SOMA based on a number of STAs which are capable of supporting SOMA. The determination may also be based on a priority of the downlink data to each STA of the number of STAs.

FIG. 13 illustrates an exemplary method for resource allocation 1300. In an embodiment, a priority may be determined 1302 based on one or more downlink packets or data streams. A priority may include or relate to background, spare, best effort, excellent effort, controlled load, video, voice and network control. A number of STAs for receiving the data packets or streams may be determined 1304. A CQI of each STA of the number of STAs for each resource unit of the AP may be determined 1306. Available RUs may be segmented 1308 based on packet priority of data packets per receiving STA. Power may be determined and allocated 1310 to the best CQI and worst CQI Rus in accordance with a low power allocation to best CQI and high power allocation to worst RUs. RUs may be allocated 1312 up to a threshold, as a percentage of priority, per STA to ensure that no STA is starved of resources.

SOMA or other access schemes may emply HARQ. Using HARQ, when a receiver incorrectly decoded a data unit, for example an MPDU, the receiver may transmit an ACK frame to the transmitter so as to request a retransmission of the one or more MPDUs which were received improperly. The ACK frame may not be MPDU based in some instances. For example, when FEC do not mirror or line up correctly in size with an MPDU, the receiver may indicate FEC blocks which should be retransmitted instead of MPDUs. The transmitter may then transmit only the FEC blocks (with some header overhead) which the receiver needs. Multiple FEC blocks may be transmitted in a new MPDU for the receiver to then HARQ combine with old FEC blocks of previously received MPDUs. In another embodiment, the ACK may be based on MPDU, i.e. bits may indicate failed MPDUs. However, the transmitter may, instead of retransmitting an entire MPDU, may transmit only the FEC blocks which correspond to that MPDU.

Embodiments disclosed herein may be implemented using circuitry which may include one or more of a modulator, laser diode, light emitting device (LED), circular buffer, multiplexor, first in first out buffer, last in last out buffer, last in first out buffer, strings, memory, state machines, Multiplexer/ALU, priority queue, microprocessor, registers, microcode, threaded pipeline, bus, field programmable gate array (FPGA), application specific integrated circuit (ASIC), baseband processor, video processor or other electronic circuit for that matter. ASICs and FPGAs may be programmed or provided with code wirelessly. Logical calculations may be performed on any parameter or parameters. ANDing, ORing, XORing, or the like may be performed in a logical or Boolean fashion. Circuitry may include interleavers such as LDPC block interleavers. Circuitry may be configured to generate a random number as input or compute a modulus operation. Circuitry may include equalizers for interference cancellation or other techniques. Equalizers may include spatial temporal linear equalizers including zero-forcing (ZF) and minimum mean square error (MMSE). Circuitry may also include amplifier(s) such as a power amplifier. Video circuitry may include a video processing unit (VPU) and a graphics processing unit (GPU). A display may be coupled to the GPU. Circuitry may include ciphering and deciphering circuitry. Circuitry may refer to buffer, for example, a time sensitive networking (TSN) buffer which may be supported by a UE or STA. TSN circuitry may include a time aware shaper. A UE or STA may have a transmitter, receiver or transceiver. Tracking, location or estimating circuitry may include magnetometers, accelerometers, velocity sensors and photodiodes. A UE may include circuitry including a UICC, application software (or firmware on chip), USIM, ISIM etc. A UE may be configured with Dual SIM devices.

Some embodiments may rely on alternative backhaul providers which are not necessarily themselves standardized by 3GPP. For example, cable modems or fiber optic modems and network may be employed. FIG. 14 illustrates a 2-step RACH procedure 1400 which provides information over a DOCSIS type backhaul. The example shows a UE 1402, co-located gNB/cable modem (CM) 1404 and cable modem termination system (CMTS) 1406.

In the example, a UE 1402 may first transmit a preamble 1408 followed by information/data 1416. As soon as the gNB receives the preamble 1402, the gNB may signal to a collocated (or remote) CM to transmit a bandwidth report (BWP) 1410 to a CMTS. Before or upon receiving the following information/data, which may comprise other small data and a BSR, the gNB may provide the BSR information 1412 to the CMTS. In this way, the CMTS can begin to allocate bandwidth regardless of not knowing an amount of bandwidth to allocate. The CMTS may use a default value by default and then update that value upon receiving an encapsulated BSR value. Other flow control parameters may be used. The CMTS may provide a bandwidth allocation map 1414 to the gNB, via the cable modem, either before or after the gNB transmits Msg2 comprising a random access response, timing advance and the like. Alternatively, the BWP may be provided to the CMTS with an indication of BSR and thus the BWP may be delayed until the CM is in receipt of the BSR. The disclosed method may apply equally for 4-step RACH. Also, the method may apply to contention based or non-contention based RACH. In some embodiments, the gNB and CM may be collocated. In some embodiment, the gNB and CM may be separated by an access link.

Bandwidth report (BWR) messages may be transmitted by the CM at any point herein, subsequent to message(s) received by a receiver disclosed herein. For example, messages received by an 802.11 type receiver may provide BWR messages to cable networks. In an embodiment, the CM may be collocated with an 802.11 type radio transmitter or a radio of another technology. The 802.11 radio or other radio may be instantiated virtually upon receiving the preamble or other data, for example, the UE ID. In this way, CMs may perform certain additional functions for UEs, which may be for example, subscribers of the backhaul network or may be subscribers/owners of the CM. The backhaul network may supply enhanced inter-cell interference coordination (eICIC) parameters, for example bitmaps signaling transmission/no transmission, to control transmissions made by the collocated CM, the collocated gNB or the like. STAs and TRPs may coordinate null transmissions. BWR messages may be provided to the cable network via mobile edge nodes, for example, mobile edge platforms or mobile edge servers.

BWR messages may indicate a bandwidth range, for example, based on a UE capability or requested data service (surgical service, video service (glasses), etc). In an embodiment, a range may be specified for virtual reality or augmented reality applications. Bandwidth may be specified in uplink and/or downlink ranges. The BWR may specify whether rendering is performed locally, in the cloud or via a MEC application. BWR may indicate QoS or QoE. BWR messages may be provided upon a virtual machine being instantiated, for example, when a CU is instantiated.

BWR messages may be transmitted when intercell interference exceeds or goes below a threshold. BWR messages may be transmitted based on fronthaul or backhaul link condition(s), for example, link quality or throughput exceeds or goes below a threshold. Interference may be measured by determining packet or frame collisions. For example, when packets collide over the wireless network, APs and STAs may determine to create records so as to determine to transmit or defer transmission when in a location or proximity to a colliding AP or STA.

A UE may report results of the radio based measurements to a base station of a same or differing technology with which it took the measurements from. Measurements and measurement reports may be based on quality of a frequency, quality of a time or quality of a beam or beams. The UE may be configured to report periodic measurement reports based on the type of base station, type of technology used, amount of frequency used or based on a beam or beams. Reporting may be group based and in this case, a signal may be broadcasted or multicasted. The report may be sent on a set of preferred beams.

Networks herein may be software defined networks, for example, which implement application, control, and data planes. Enforcement of fine grained or gross grained policies may be performed by a device over multiple operator networks and multiple RATs using forwarding devices and control devices. Devices may determine, via control messaging, whether to endorse fine grain policies or course grain network management policies. Policies may be gross in terms of the messaging provides. For example, a subset of messaging policy messages may apply for a gross management system. A finer set of messages may be activated during fine policy control. A network may determine fine vs. gross based on number of users, signal strength, delay in the core network, delay of other networks, timeouts on packets or switches etc.

A network device, for example, a configuration server may configure forwarding or other device flow tables. Flow tables may be packet or frame based and may include routing information for control and application signaling. Flow tables may be multiple-RAT based, for example, based on the configured or capable RATs of a device. A UE which is 802.11 EHT capable may be configured with tables per link or per base station. UEs or other devices which are configured for LTE and/or NR may have cellular flow based tables, for example, based on cell, frequency beam or the like.

RATs may be domain specific, for example, relating to a service provider domain and not simply user specific. This may be true regardless of technology. Handover between the RATs may be performed on a domain basis. Sampling of processing delay and propogation delay calculation may be performed by any node herein, for example, a router, TRP (gNB, AP etc), or the like. Delay values may be reported to a central controller or other node. For example, TRP→re-porting of delays may be performed. Latenc(ies) or average packet delay may be calculated at each node for reporting. Latencies may be calculated per node, per link, per cell, per group of users, per location of users, or the like.

Routing tables may be implemented at the UE per link, per cell, per RAT etc. Routing tables may be dynamically modified by the UE based on RSSI or other signal indicator and also provided by a controller. Rules may be modified based on messages received from the controller or node.

Routing tables may be maintained at nodes. Tables may be updated based on altered flows due to change of channel conditions and also based on instructions received from other nodes and control equipment. Tables may be updated node→node as well. A central controller may or may not be needed if a distributed approach is selected. For small networks, a central controller may be instantiated once users in a group, cell, domain etc exceed a given size. A central controller may be torn down once the size becomes smaller than a threshold.

An Access Traffic Steering, Switching, and Splitting (ATSSS) user plane function (UPF) may translate access network specific addresses of each 802.11be link into an address of a Multi-Access (MA) IP address and vice versa. Access traffic steering may include selecting a link of an AP for a new data flow and the transfer of the traffic of that data flow over the link. Access traffic switching may include migration of all packets of an ongoing data flow from one link of one AP to another link of the AP or to another access network. Access traffic splitting may include forwarding packets of a data flow across multiple access networks and/or multiple links of a single access network simultaneously.

FIG. 15 shows that ATSSS rules from the network 1500 may be configured to a UE 1502 and ATSSS UPF 1514. The rules may indicate information enabling the UE to select from a 3GPP access network 1504 and a links of a first non 3GPP AP 1506-1510 or another non 3GPP AP 1512. The information may indicate that the UE should instantiate new links of an 802.11be or greater compatible STA/AP pair or to instantiate a new non-3GPP connection.

FIG. 16 shows that ATSSS rules from the network 1600 may be configured to a UE 1602 and MPTCP proxy 1614. The rules may indicate information enabling the UE to select from a 3GPP access network 1604 and a links of a first non 3GPP AP 1606-1610 or another non 3GPP AP 1612. The information may indicate that the UE should instantiate new links of an 802.11be or greater compatible STA/AP pair or to instantiate a new non-3GPP connection.

Techniques to provide ATSSS are classified by the 3GPP into two flavors: (1) higher-layer techniques which operate above the IP layer (e.g., MPTCP), and (2) lower-layer techniques which operate below the IP layer. (for example, PHY/MAC commands disclosed herein or otherwise).

The 5G control plane provides the UE and the ATSSS UPF with rules that specify which flows are eligible to the ATSSS service (i.e., by mapping them to a Multi-Access PDU Session). Once a Multi-Access PDU Session has been established, a set of rules are then delivered to both the UE and the ATSSS UPF in order to enable consistent treatment of the flows by both the UE and the ATSSS UPF within the Session.

Measurements may be made by the UE to the user plane function via round trip time (RTT) measurement taking. For example, by transmitted a message on the non-3gpp access and measuring a time for which a response is made. In the case of 802.11be, when there are multiple links from a same AP, over a same distribution network, it may not be imperative to perform RTT over each link individually. Instead, a single link could be used for RTT and individual link PHY/MAC measurements may be used as an offset to adapt the end to end RTT.

An AP may provide RTT information, to a UE, over one or more links. For example, the AP may determine the RTT information via timing of packet transmission/reception (for example, ACK reception). In another embodiment, the UE may perform the RTT timing and provide same to the AP or other server or function in the network. The RTT information may also be shared among non co-located APs, from AP to AP, since the APs may be associated to a same distribution network.

Servers may specify configurations for UEs and APs to perform measurement checking. For example, measurement configurations may indicate servers and/or server addresses and other network parameters to use, a band or frequency, an AP identifier, Device to device information, resource pool information to perform the transmissions/receptions on, link information, IP address, MAC address or the like.

Certain links may better support UDP traffic vs TCP or vice versa. The UE or AP may report characteristic information, an may receive a protocol to link mapping as an access rule or configuration. A mobile edge computing device or platform may assist in providing/selecting access rules. The MEC may provide any parameter disclosed herein to the UE, proxy, user plane function or the like.

Packet order reconstruction may be based on IP address and/or IP address and MAC address pairs. For example, a MAC address may uniquely identify a link and thus may be provided up the stack correctly without first performing IP packet inspection.

What is claimed is:

1. A wireless device having a plurality of media access control (MAC) addresses, the wireless device comprising:
a receiver configured to receive information about a second access point (AP) from a first AP;
the receiver configured to receive a first group based transmission, on an operating band of the first AP, from the first AP, wherein the first group based transmission has a preamble portion which indicates a modulation scheme used for a portion subsequent to the preamble portion, wherein the first group based transmission has a first data portion, wherein the first group based transmission includes a first header portion;
the receiver configured to receive a second group based transmission, on an operating band of the second AP, from the second AP, wherein the second group based transmission has a second data portion, wherein the second data portion is modulated according to 4096 quadrature amplitude modulation (QAM), wherein the second group based transmission includes a second header portion;
circuitry configured to determine whether the first group based transmission comprises data which is duplicative of the second group based transmission, based on the first header portion and the second header portion; and
a transmitter configured to transmit feedback, to the first AP or the second AP, based on reception of the data;
wherein the first group based transmission is received via a first link corresponding to a first MAC address of the plurality of MAC addresses and the second group based transmission is received via a second link corresponding to a second MAC address of the plurality of MAC addresses, wherein the first MAC address and the second MAC address are different.

2. The wireless device of claim 1, wherein the first AP and the second AP are collocated.

3. The wireless device of claim 1, wherein the duplication detection is performed based on a sequence number.

4. The wireless device of claim 1, wherein the circuitry includes buffer circuitry and the information comprises an operating band of the second AP.

5. The wireless device of claim 4, wherein the buffer circuitry is a first in first out buffer circuitry.

6. The wireless device of claim 1, wherein the first data portion is modulated according to 1024 QAM or 2048 QAM.

7. The wireless device of claim 1, wherein the first data portion and the second data portion comprise encrypted data.

8. The wireless device of claim 1, wherein the wireless device is a station.

9. The wireless device of claim 1, wherein the first AP and the second AP are within communication range.

10. The wireless device of claim 1, wherein the preamble portion is modulated according to binary phase shift keying (BPSK) modulation.

11. A wireless device having a plurality of media access control (MAC) addresses, the wireless device comprising:
a receiver configured to receive information about a second access point (AP) from a first AP;
the receiver configured to receive a first group based transmission, on an operating band of the first AP, from the first access point (AP), wherein the first group based transmission has a preamble portion which indicates a modulation scheme used for a portion subsequent to the preamble portion, wherein the first group based transmission has a first data portion, wherein the first group based transmission includes a first header portion;
the receiver configured to receive a second group based transmission, on an operating band of the second AP, from the second AP, wherein the second group based transmission has a second data portion, wherein the second data portion is modulated according to 4096 quadrature amplitude modulation (QAM), wherein the second group based transmission includes a second header portion;
circuitry configured to determine whether the first group based transmission comprises encrypted data which is duplicative of the second group based transmission, based on the first header portion and the second header portion; and
a transmitter configured to transmit feedback, to the first AP or the second AP, based on reception of the encrypted data;
wherein the first group based transmission is received via a first link corresponding to a first MAC address of the plurality of MAC addresses and the second group based transmission is received via a second link corresponding to a second MAC address of the plurality of MAC addresses, wherein the first MAC address and the second MAC address are different.

12. The wireless device of claim 11, wherein the preamble portion is modulated according to binary phase shift keying (BPSK) modulation.

13. The wireless device of claim 11, wherein the first AP and the second AP are collocated; wherein the first AP and the second AP have different media access control (MAC) addresses, wherein the first group based transmission is received simultaneously with the second group based transmission.

14. The wireless device of claim 11, wherein the wireless device, the first AP and the second AP share a key agreement.

15. The wireless device of claim 11, wherein the first group based transmission is preceded by a first request to send (RTS) frame and a first clear to send (CTS) frame, wherein the second group based transmission is preceded by a second RTS frame and a second CTS frame.

16. The wireless device of claim 11, wherein the first group based transmission and the second group based transmission include data provided by one or more content distribution networks (CDNs).

17. A wireless device having a plurality of media access control (MAC) addresses, the wireless device comprising:
    a receiver configured to receive information about a second access point (AP) from a first AP;
    the receiver configured to receive a first group based transmission, on an operating band of the first AP, from the first AP, wherein the first group based transmission has a preamble portion which indicates a modulation scheme used for a portion subsequent to the preamble portion, wherein the first group based transmission has a first data portion, wherein the first group based transmission includes a first header portion;
    the receiver configured to receive a second group based transmission, on an operating band of the second AP, from the second AP, wherein the second group based transmission has a second data portion, wherein the second data portion is modulated according to quadrature amplitude modulation (QAM), wherein the second group based transmission includes a second header portion; and
    circuitry configured to determine whether the first group based transmission comprises data which is duplicative of the second group based transmission, based on the first header portion and the second header portion;
    wherein the first group based transmission is received via a first link corresponding to a first MAC address of the plurality of MAC addresses and the second group based transmission is received via a second link corresponding to a second MAC address of the plurality of MAC addresses, wherein the first MAC address and the second MAC address are different.

18. The wireless device of claim 17, wherein the first AP and the second AP are collocated.

19. A method performed by a wireless device having a plurality of media access control (MAC) addresses, the method comprising:
    receiving a first group based transmission, on an operating band of a first access point (AP), from the first AP, wherein the first group based transmission has a preamble portion which indicates a modulation scheme used for a portion subsequent to the preamble portion, wherein the first group based transmission has a first data portion, wherein the first group based transmission includes a first header portion;
    receiving a second group based transmission, on an operating band of a second AP, from the second AP, wherein the second group based transmission has a second data portion, wherein the second data portion is modulated according to quadrature amplitude modulation (QAM), wherein the second group based transmission includes a second header portion; and
    determining whether the first group based transmission comprises data which is duplicative of the second group based transmission;
    wherein the first group based transmission is received via a first link corresponding to a first MAC address of the plurality of MAC addresses and the second group based transmission is received via a second link corresponding to a second MAC address of the plurality of MAC addresses, wherein the first MAC address and the second MAC address are different.

20. The method of claim 19, wherein the determining whether the first group based transmission comprises data which is duplicative of the second group based transmission is based on the first header portion and the second header portion.

* * * * *